United States Patent
Bolger

(10) Patent No.: US 12,475,014 B2
(45) Date of Patent: Nov. 18, 2025

(54) TRAINING OF FORECASTING MODELS FOR TIME SERIES ANOMALY DETECTION APPLICATIONS

(71) Applicant: Analog Devices International Unlimited Company, County Limerick (IE)

(72) Inventor: Eoin Seamus Bolger, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 73 days.

(21) Appl. No.: 18/453,667

(22) Filed: Aug. 22, 2023

(65) Prior Publication Data

US 2025/0068536 A1  Feb. 27, 2025

(51) Int. Cl.
*G06F 11/34* (2006.01)
*G06F 11/30* (2006.01)

(52) U.S. Cl.
CPC ...... *G06F 11/3075* (2013.01); *G06F 11/3419* (2013.01)

(58) Field of Classification Search
CPC .......... G06F 11/3075; G06F 11/3419
USPC ....................................... 714/37, 48
See application file for complete search history.

(56) References Cited

U.S. PATENT DOCUMENTS

| | | | | |
|---|---|---|---|---|
| 2015/0262083 A1* | 9/2015 | Xu | ............ | G06N 20/10 706/12 |
| 2020/0372298 A1* | 11/2020 | Challis | ............ | G06F 11/302 |
| 2021/0160262 A1* | 5/2021 | Bynum | ............ | H04L 43/16 |
| 2022/0114472 A1* | 4/2022 | Davies | ............ | H04N 21/251 |
| 2022/0147841 A1* | 5/2022 | Chen | ............ | G05B 19/4184 |
| 2022/0197890 A1* | 6/2022 | Fotak | ............ | G06F 17/18 |
| 2022/0200878 A1* | 6/2022 | Fotak | ............ | G06F 18/214 |
| 2023/0104896 A1* | 4/2023 | Pattipati | ............ | G01R 31/3277 706/21 |
| 2023/0291657 A1* | 9/2023 | Cawley | ............ | H04L 43/067 |
| 2023/0376012 A1* | 11/2023 | You | ............ | G05B 19/41835 |
| 2024/0125675 A1* | 4/2024 | Asif | ............ | G05B 23/024 |
| 2024/0202579 A1* | 6/2024 | Doan Huu | ............ | G06N 20/00 |

OTHER PUBLICATIONS

Yufeng et al., "Time series outlier detection based on sliding window prediction", Journal of Computer Applications34.8: 2217-20, 2226. Science Press. (Aug. 10, 2014) (Year: 2014).*
Arjovsky et al., Wasserstein GAN. Courant Institute of Mathematical Sciences, Facebook AI Research. arXiv:1701.07875v3, Dec. 6, 2017. 32 pages. URL: https://arxiv.org/pdf/1701.07875.pdf.

(Continued)

*Primary Examiner* — Chae M Ko
(74) *Attorney, Agent, or Firm* — ArentFox Schiff LLP

(57) ABSTRACT

Predicted observations within a first window are forecast by a predictor and a residual signal is calculated based on a difference between predicted observations and true observations. A gradient of the residual signal is determined indicative of a degree of divergence. When the gradient is outside a predetermined range, the predictor is retrained. Based on further predicted observations forecast by the predictor, a confidence envelope for a second window is generated and, using the confidence envelope, it is determined whether an outlier portion exists within the second window.

19 Claims, 13 Drawing Sheets

(56) References Cited

OTHER PUBLICATIONS

Siami-Namini et al., A comparison of ARIMA and LSTM in forecasting time series. In2018 17th IEEE international conference on machine learning and applications (ICMLA), Dec. 17, 2018 pp. 1394-1401.

Zhang et al., Comparison of ARIMA and LSTM for prediction of hemorrhagic fever at different time scales in China, PLOS One. Jan. 14, 2022;17(1):e0262009. 14 pages.

Lee et al., "RePAD: Real-time Proactive Anomaly Detection for Time Series", Jan. 10, 2023, Proceedings of the 34th International Conference on Advanced Information Networking and Applications vol. 1151, XP 093239113, DOI: 10.1007/978-3-030-44041-1_110, 14 pages.

Lee et al., "ReRe: A Lightweight Real-time Ready-to-Go Anomaly Detection Approach for Time Series", Nov. 28, 2022, URL: https://arxiv.org/pdf/2004.02319, XP 093239114, DOI: 10.48550/arxiv.2004.02319, 12 pages.

Oliveira et al., "Detecting Novelties in Time Series Through Neural Networks Forecasting With Robust Confidence Intervals", Dec. 1, 2006, Neurocomputing, vol. 70, No. 1-3, XP 093239115, DOI: 10.1016/j.neucom.2006.05.008, 14 pages.

Blázquez-García et al., "A Review on Outlier/Anomaly Detection in Time Series Data", Apr. 17, 2021, ACM Computing Surveys, vol. 54, No. 3, Article 56, XP 058679034, DOI: 10.1145/3444690, 33 pages.

Zahra Zamanzadeh Darban et al., "Deep Learning for Time Series Anomaly Detection: A Survey", Dec. 5, 2022, ACM, XP 093239117, URL: http://arxiv.org/abs/2211.05244v2, 43 pages.

Extended European Search Report received for European Patent Application No. 24190004.2, mailed on Jan. 24, 2025, 10 pages.

[No Author Listed], "Bollinger Bands", Fidelity Learn Center. Sep. 26, 2015. https://www.fidelity.com/learning-center/trading-investing/technical-analysis/technicalindicator-guide/bollinger-bands, [last access Aug. 24, 2023]. 3 pages.

[No Author Listed], "Mean Absolute Percentage Error (MAPE)", Statistics How To. https://www.statisticshowto.com/mean-absolute-percentage-error-mape/. Publicly available at least as early as 2000. 3 pages, [last access Aug. 24, 2023].

[No Author Listed], "Mode Collapse Mode Collapse, Common Problems", Google Machine Learning Advanced courses. Aug. 31, 2019. https://developers.google.com/machinelearning/gan, [last accessed Aug. 25, 2023]. 3 pages.

Kutzkov, "ARIMA vs Prophet vs LSTM for Time Series Prediction", neptune.ai. MLOps Blog. Jul. 31, 2023, [last accessed Aug. 25, 2023]. 27 pages.

Wang, "The Vanishing Gradient Problem, The Problem, Its Causes, Its Significance, and Its Solutions", Towards Data Science. Jan. 8, 2019. https://towardsdatascience.com/the-vanishinggradient-problem-69bf08b15484?gi=b0e2e43955af, [last accessed Aug. 25, 2023]. 2 pages.

* cited by examiner

TRAINING OF FORECASTING MODELS FOR TIME SERIES ANOMALY DETECTION APPLICATIONS

FIELD OF INVENTION

The present disclosure relates to anomaly detection within time-series signals. Particularly, but not exclusively, the present disclosure relates to predictive confidence level based anomaly detection within time-series signals; more particularly, but not exclusively, the present disclosure relates to retraining models used in generating confidence levels based on gradient constraints.

BACKGROUND

A time-series, or time-series signal, is a sequence of time-indexed observations obtained over a period, or interval, of time. The sequence of observations will typically relate to a single entity. For example, measurements intermittently taken from a sensor over an interval of time form a time-series signal whereby each observation within the time-series signal corresponds to a measurement obtained from the sensor at a given time point.

Time-series analysis describes a suite of techniques for processing and analysing time-series signals. One aspect of time-series analysis is detecting anomalous signals or portions of a time-series signal. Often referred to as outliers, these anomalous signals represent noise or errors obtained during the recordal or transmission of a time-series signal. For example, a surge detected at a voltage sensor would appear as an outlier or anomaly within a time-series signal recorded from the voltage sensor. Removing such anomalies from a time-series signal may thus be a useful pre-processing step to help clean the time-series signal and ensure that only relevant observations are contained therein.

Anomaly detection in time series data is a challenging problem as it requires time-series forecasting, which is notoriously difficult. The structure of the time-series data dictates the types of pre-processing methods to be used such as filtering, scaling, and anomaly detection/removal. The predictive confidence level is the most common method used with non-linear data, due to its adaptability and prediction accuracy. However, standard methods for producing confidence levels trade forecast duration with accuracy and are often limited to simpler time-series data trends and relationships.

SUMMARY OF INVENTION

The present disclosure provides a method and device for time-series based anomaly detection. A computer-implemented method for time-series based anomaly detection, the method comprises obtaining a first predictor trained on a set of training observations within a training window of a time-series signal. The first predictor forecasts a predicted observation for a given time point. A first set of observations of the time-series signal within a first window is also obtained, and the first window being subsequent to the training window. A first set of predicted observations within the first window is forecast by the first predictor, such that each time point within the first window is associated with an observation within the first set of observations and a predicted observation within the first set of predicted observations.

The method further comprises calculating a residual signal based on a difference between one or more observations of the first set of observations and one or more predicted observations of the first set of predicted observations. A gradient of the residual signal is determined, and the gradient is indicative of a degree of divergence between the first set of observations and the first set of predicted observations over the first window. When the gradient is outside a predetermined range, the method comprises retraining the first predictor on the first set of observations thereby generating a retrained predictor.

A second set of observations of the time-series signal within a second window is obtained, the second window being subsequent to the first window, and a second set of predicted observations within the second window is forecast using the retrained predictor. Based on the second set of predicted observations, a confidence envelope for the second window is generated and, using the confidence envelope, it is determined whether an outlier portion exists within the second window. The outlier portion comprises one or more observations of the second set of observations that are outside the confidence envelope.

As such, aspects of the present disclosure allow accurate and efficient identification of anomalies within a time-series signal. This efficiency allows the method of the present disclosure to be deployed on edge devices where processing and memory resources are limited. Moreover, utilising the deviation point of an outlier portion of a time-series signal allows the outlier portion (i.e., the anomaly) to be more accurately identified and replaced, particularly when the outlier portion begins at a point prior to the signal exceeding the confidence interval. In many safety critical application areas (such as biomedical applications), this improved accuracy may help reduce false positives whereby anomalous portions of a signal may be incorrectly identified as important events (e.g., a rapid increase in heart rate or glucose level).

The proposed comparative method enforces a gradient constraint on the forecasting model, where the gradient of the residual signal must be within a predetermined range or else the forecasting model is retrained. This ensures that the model predictions and the true observations are not continuously diverging by analysing the gradient between predictions and observations. It also ensures the forecasting model predictions are accurate enough in the models current training stage to be used to make forecasts. This method is invariant to the type of model incorporated or the structure of the time series data.

In contrast to using a simplified model to reduce training time, which achieves much lower performance, the embodiments herein enable a much more complex model to be used, as the number of times the model must be trained is reduced significantly. Enforcing a gradient constraint also saves power consumption via reduction in computational resources as training is intermittent. Additionally, a complex model is able to produce non-linear forecasts, unlike simplified models.

Further features and aspects of the disclosure are provided in the appended claims.

BRIEF DESCRIPTION OF DRAWINGS

The present disclosure will now be described by way of example only with reference to the accompanying drawings in which.

DETAILED DESCRIPTION

Many applications within the domain of signal processing and time-series analysis involve time-series signals with outlier or anomalous events. For example, time-series signals obtained from sensors may contain anomalous observations corresponding to inadvertent interaction with the sensor (e.g., the sensor being knocked or displaced) or anomalous increases or decreases in the process being sensed (e.g., a power surge). Other sources of such anomalous events include noise and sensor degradation due to age. Identifying and replacing such anomalous observations is an important pre-processing step within time-series applications. Specifically, in many application areas, identifying and removing anomalies helps improve control or operation of devices (e.g., biomedical devices such as dialysis machines or heart rate sensors) based on the processed time-series signal.

The methods and processes of the present disclosure provide a faster and more efficient approach to anomaly detection by reducing the number of times that the anomaly detection model must be retrained. While previous methods rely on using simplified models to reduce training time, the present disclosure employs gradient constraints which allow for more complex models to be used thereby increasing efficiency and accuracy of anomaly detection systems. Moreover, embodiments of present disclosure describe improved methods for predicting anomalous portions of time-series data and replacing anomalous portions so that methods and systems relying on time-series signals are improved. Specifically, the reliability of outputs from sensitive biomedical devices such as dialysis machines or heart rate sensors are improved as a result of the application of methods disclosed herein.

Figure 1:
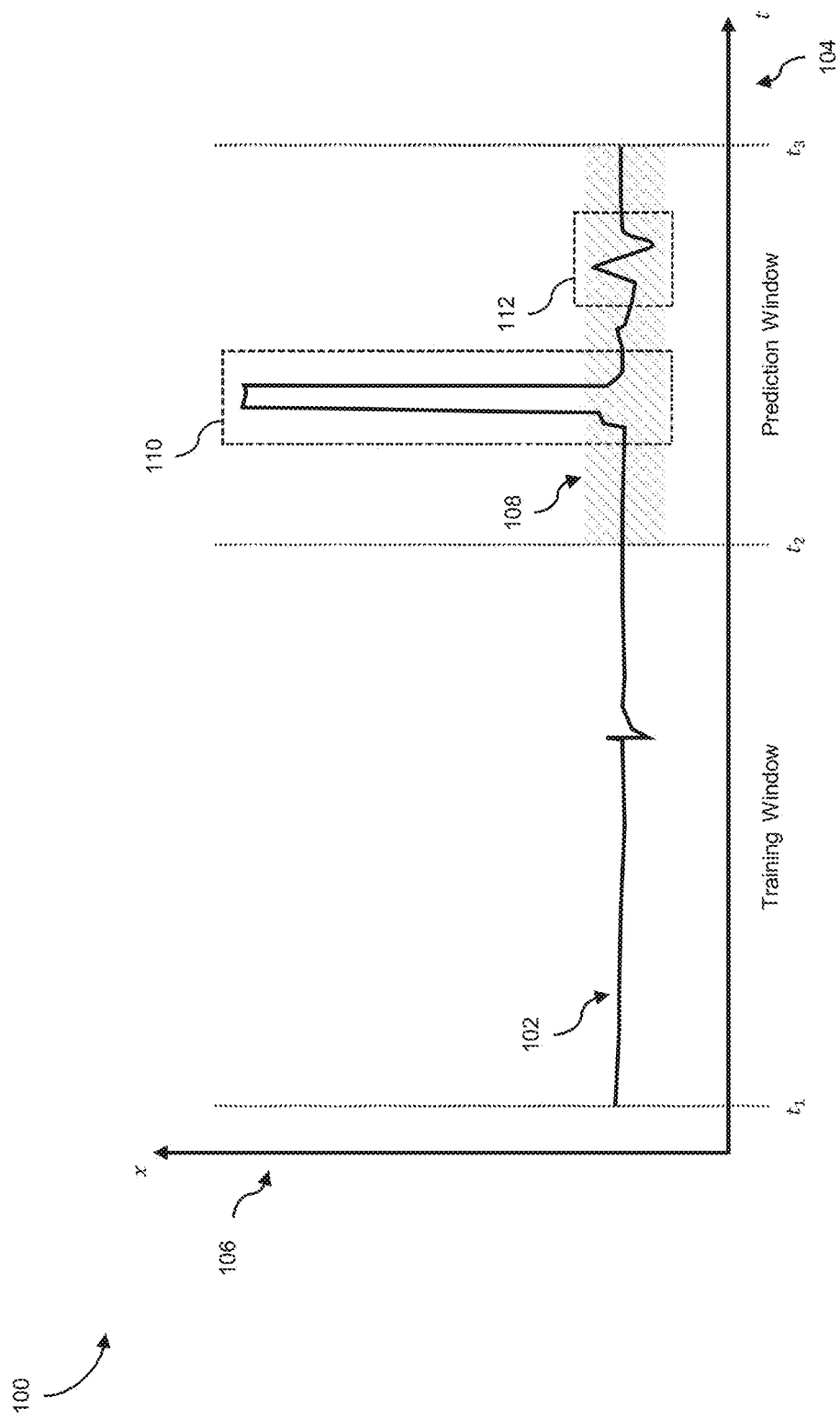
FIG. 1 shows a plot of a time-series signal comprising an anomaly.

FIG. 1 shows a plot 100 of a time-series signal comprising an anomaly.

The plot 100 shows a time-series signal 102 plotted against a first axis 104 and a second axis 106. The first axis 104 corresponds to time, t, and the second axis 106 corresponds to an observation value or measurement (e.g., voltage, pulse rate, concentration level, etc.). The time-series signal 102 is shown plotted between time points $t_1$, $t_2$, and $t_3$. The window between time point $t_1$ and time point $t_2$ corresponds to a training window of the time-series signal 102. The window between time point $t_2$ and time point $t_3$ corresponds to a prediction window of the time-series signal 102. The plot 100 further shows, within the prediction window, a confidence envelope 108 for the prediction window, an outlier portion 110 of the time-series signal 102, and a non-outlier portion 112 of the time-series signal 102.

A time-series based predictor may be used to detect the presence of the outlier portion 110, alternatively referred to as an outlier, anomaly, or anomalous portion, within the time-series signal 102. Specifically, a time-series predictor, such as an autoregressive integrated moving average (ARIMA) model, a neural network model, or another type of machine learning model, may be trained on the observations within the training window. Once trained, the time-series predictor forecasts, or estimates, an observation value at a time point t+1 based on a previous window of observations (e.g., observations at time points t, t−1, . . . , t−n). Alternatively, the time-series predictor forecasts a plurality of observation values at future time points (e.g., time points t+1, . . . , t+m) based on the previous window of observations. In the example shown in the plot 100, the time-series predictor forecasts predicted observations, or predictions, for all time points within the prediction window $t_2$ to $t_3$.

The confidence envelope 108 may be calculated based on the predictor or the observations output from the predictor and corresponds to the uncertainty that the predictor has in relation to the predictions produced within the prediction window. The confidence envelope 108 comprises an upper envelope corresponding to the upper region, or threshold, of the confidence envelope 108, and a lower envelope corresponding to the lower region, or threshold, of the confidence envelope 108. In some examples, the confidence envelope corresponds to a confidence interval having a fixed upper and lower envelope across the prediction window (as illustrated by the confidence envelope 108 of FIG. 1). In alternative examples, the confidence envelope corresponds to a confidence band having upper and lower envelopes which vary across the prediction window. Examples for calculating the confidence level include: the error rate of the predictor; statistical deviation of the predictor; statistical deviation of the outputs of the predictor; a confidence value output by the predictor; a confidence value output by a second machine learning model; a predefined confidence metric; or other statistical variations.

Confidence level anomaly detection techniques utilize confidence envelopes to detect outliers within a time-series signal. In the example shown in the plot 100, the time-series signal 102 may be compared to the confidence envelope 108 to identify the outlier portion 110 of the time-series signal 102 which lies outside the confidence envelope 108. The outlier portion 110 is considered to be an outlier because it comprises a plurality of observations which lie outside of the observed error margins, or uncertainty, of the predictor. In contrast, the non-outlier portion 112 shown in the plot 100 comprises a high-level of variability (e.g., due to noise) but lies within the confidence envelope 108, and thus within the observed error margins of the predictor. An example method for confidence level anomaly detection is described in relation to method 200 of FIGS. 2A-2B below.

Once detected remedial action can be initiated. For example, the outlier observations, i.e., the observations within the outlier portion 110 which lie outside of the confidence envelope 108, may be replaced by predicted observations determined by the predictor.

Existing predictive confidence level approaches to time-series based anomaly detection, such as that described in relation to FIG. 1, are often slow and require a sliding window to be incrementally applied to a time-series signal to detect and replace anomalies. For example, after performing anomaly detection at time points $t_1$, $t_2$, and $t_3$, the process is repeated at time points $t_1+1$, $t_2+1$, and $t_3+1$. Moreover, existing approaches are unable to identify anomalies accurately within non-stationary time-series signals and when the anomaly starts at a point prior to the time-series signal exceeds the confidence envelope.

Additionally, the models used for generating predictions are often simplified and prediction distance is reduced to the minimum to reduce training time, which is considered a major bottle keck of anomaly detection systems. This means that only a very basic model can be used however, achieving lower performance. Simplistic models require more frequent retraining to maintain accuracy and are unable to accurately forecast complex time-series signals, or can only do so with poor accuracy.

Some if not all of these issues are addressed by the methods of the present disclosure, such as by using gradient constraints to determine whether to retrain a predictor, as disclosed in FIGS. 2A-2B below, which allows for more accurate and efficient forecasting of predictions.

Figure 2A:
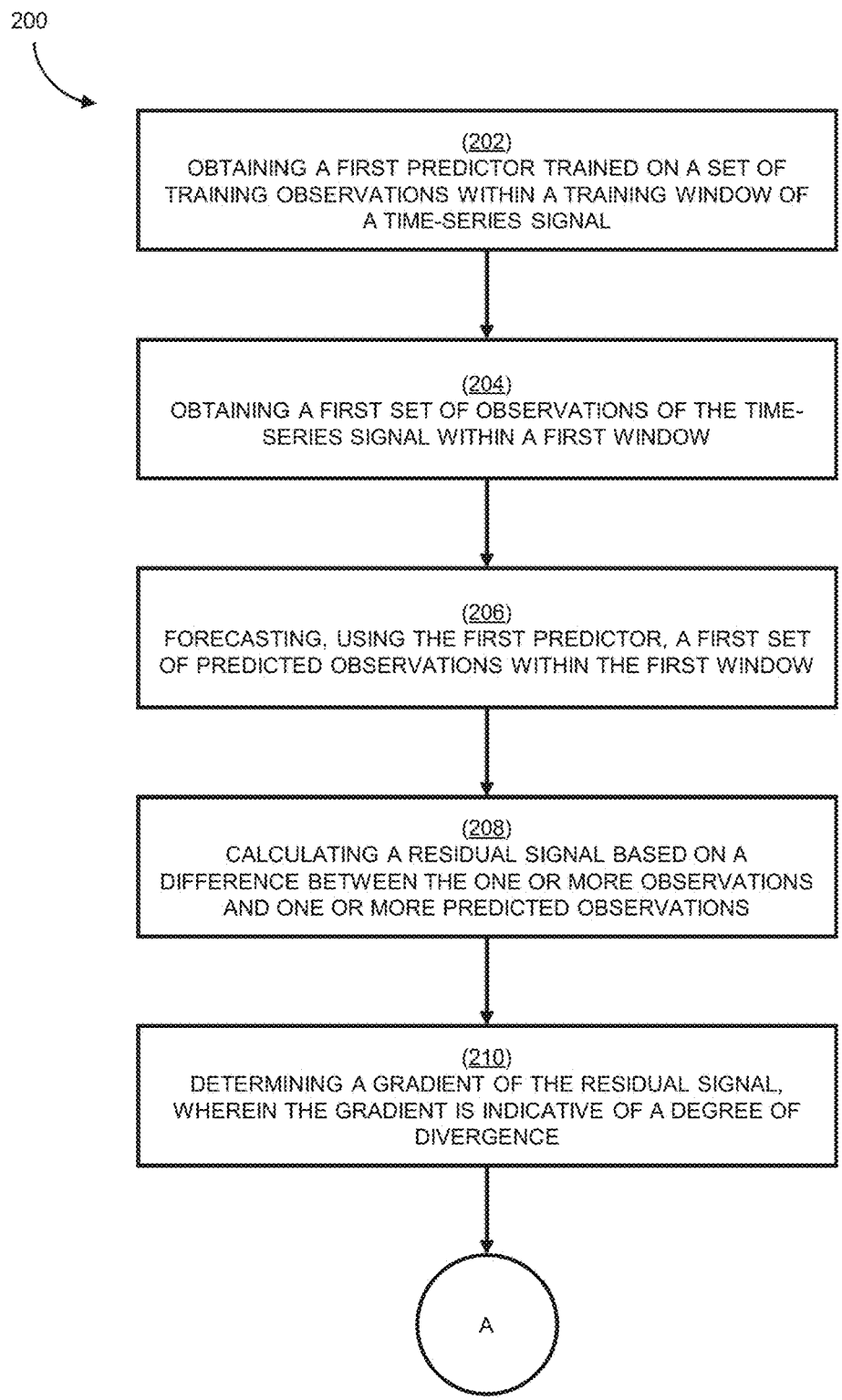
FIGS. 2A and 2B show a flow chart illustrating a computer-implemented method for time-series signal based anomaly detection, including retraining a first predictor based on a gradient of a residual signal.
Figure 2B:
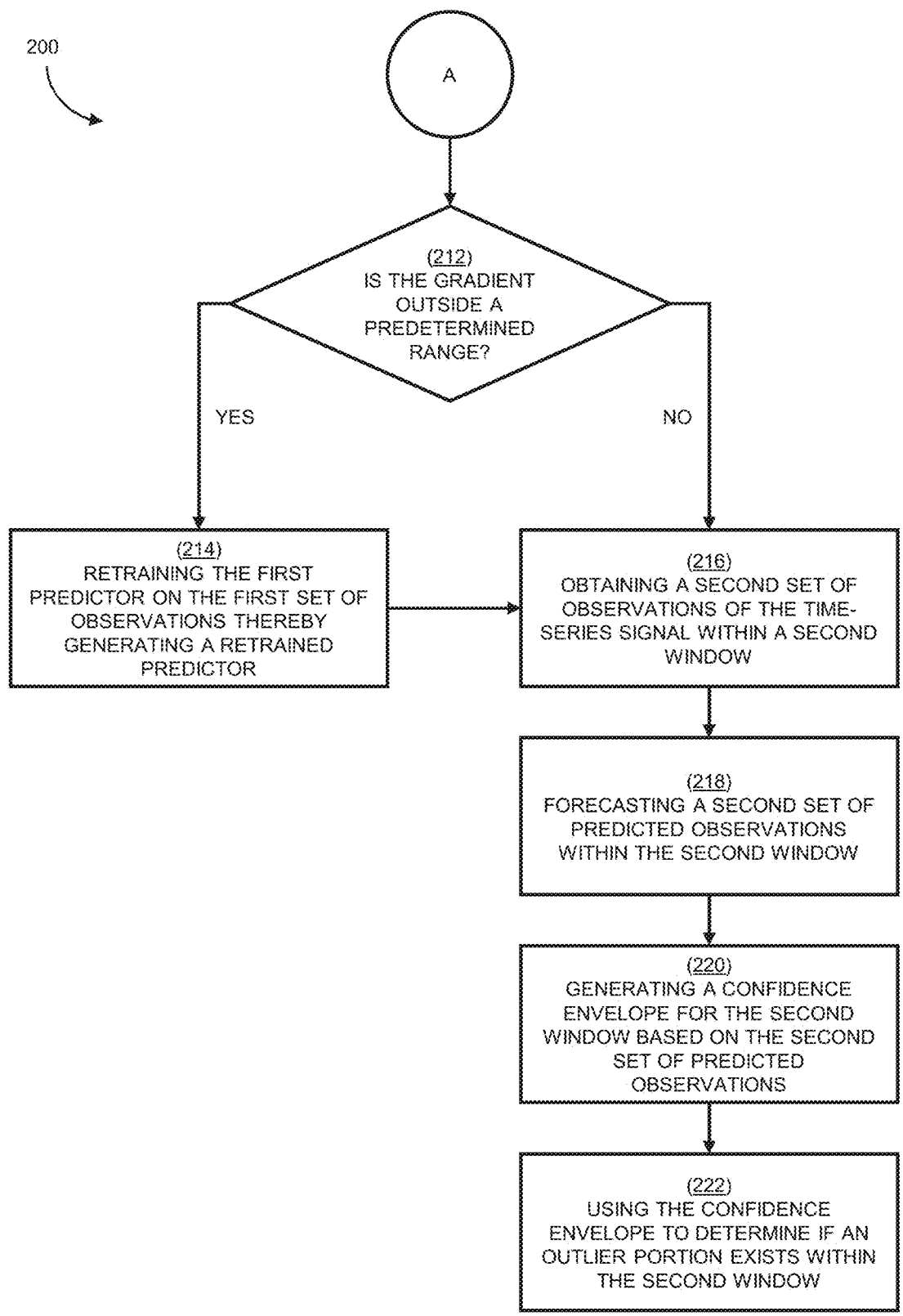

FIGS. 2A-2B show method 200 for time-series signal based anomaly detection, such as detecting the above time-series signal comprising an anomaly of FIG. 1.

Method 200 comprises step 202, step 204, step 206, step 208, step 210, step 212, optional step 214, step 216, step 218, step 220, and step 222. Step 202 comprises obtaining a first predictor trained on a set of training observations within a training window of a time-series signal; step 204 comprises obtaining a first set of observations of the time-series signal within a first window; step 206 comprises forecasting, using the first predictor, a first set of predicted observations within the first window; step 208 comprises calculating a residual signal based on a difference between one or more observations and one or more predicted observations; step 210 comprises determining a gradient of the residual signal, where the gradient is indicative of a degree of divergence; step 212 comprises determining if the gradient is outside a predetermined range; step 214 comprises retraining the first predictor on the first set of observations thereby generating a retrained predictor; step 216 comprises obtaining a second set of observations of the time-series signal within a second window; step 218 comprises forecasting a second set of predicted observations within the second window; step 220 comprises generating a confidence envelope for the second window based on the second set of predicted observations; and step 222 using the confidence envelope to determine if an outlier portion exists within the second window.

In general, method 200 uses a first predictor to predict observations of the time-series signal at a future time point, which are then used to determine if an outlier portion exists within a time-series signal at this time point. As described above in relation to FIG. 1, the first predictor is used to generate a set of predicted observations at time points within a prediction window. A confidence envelope is generated based on this set of predicted observations, which represent a range of expected observations. The measured observations of the time-series signal can be compared to the predicted observations such that observations falling outside of the confidence envelope are determined to be anomalies.

In order to determine whether the first predictor is producing accurate observations, a residual signal based on the difference between predicted and measured observations is calculated. The gradient of the calculated residual signal is indicative of whether the predicted observations are diverging from the measured observations, such that the first predictor is no longer predicting the trends of the time-series signal accurately. Therefore, if the gradient is outside of a predetermined range associated with a target quality of predictions, the first predictor is retrained or otherwise updated. Resulting predicted observations, and the associated confidence envelope, are subsequently more accurate and within the target quality. However, the model does not need to be retrained unless predicted observations diverge from measured observables thereby increasing the efficiency of anomaly detection (by avoiding superfluous or redundant retraining of the model) without impacting accuracy.

By retraining only when the gradient of the residual signal is outside of a predefined range, the number of times that the first predictor is retrained is reduced. Method 200 therefore improves computational performance and makes more efficient use of resources without compromising prediction accuracy. The calculated gradient of the residual signal is indicative of a degree of divergence between the first set of observations and the first set of predicted observations. Consequently, a gradient outside of the predetermined range would indicate that one or more trends associated with the first set of predicted observations was not consistent with one or more trends associated with the first set of observations. If the one or more trends are not consistent—i.e., if there is a high degree of divergence—then the first predictor is retrained, generating a retrained predictor. If the one or more trends are consistent—i.e., if there is a low degree of divergence—then the first predictor is not retrained. The retrained predictor or the first predictor is then used to forecast a second set of predicted observations which are subsequently used for anomaly detection.

Step 202 comprises obtaining a first predictor trained on a set of training observations within a training window of a time-series signal. The first predictor is configured to forecast a predicted observation for a given time point.

The training observations are either measured observations, such as collected from a sensor, or synthetic observations, such as generated from a simulation or a generative network model. The first predictor is a machine learning or statistical model trained to predict future observations associated with the time-series signal, such as convolutional neural network 1000 described in more detail in relation to FIG. 10 below.

In one example, the first predictor is trained to predict observations to detect anomalies in a measured time-series signal, e.g., measured observations collected in real-time from a sensor. In another example, the first predictor is trained to predict observations to replace outlier portions containing anomalies in the time-series signal. Optionally, the first predictor comprises multiple machine learning models and/or the first predictor is trained to predict observations from more than one time-series signal.

Preferably, the first predictor is a deep learning model. For example, the first predictor comprises any of a recurrent neural network, a convolutional neural network, a long short-term memory model, an autoencoder, or a Boltzmann machine. In another, the deep learning model may be a generative adversarial network (GAN), such as a GAN adapted by applying Wasserstein loss during training of the GAN. The Wasserstein loss is based on evaluating an effort required to make the first set of predicted observations equal to the first set of observations. Applying Wasserstein loss helps alleviate mode collapse and prevent vanishing gradients by optimally training the discriminator. The discriminator does not become stuck on local minima and learns to reject outputs that the generator may otherwise stabilize on. The adapted generative adversarial network is further adapted by applying a Lipschitz constraint to a discriminator of the GAN, preventing a gradient value above the Lipschitz constraint from being used during training. In other words, the generative adversarial network using Wasserstein loss is subject to 1-Lipschitz Continuous, e.g., the norm of its gradient needs to be at most one.

Step 204 comprises obtaining a first set of observations of the time-series signal within a first window. The first window is subsequent to the training window, with examples shown in FIG. 10 below.

The first set of observations are associated with data collected from one or more sensors over the first window and may or may not comprise anomalies. As such, an observation may be understood as being a value, or measurement, obtained from a sensor at a certain time point. The first set of observations may thus be considered a set of values, or measurements, obtained from one or more sensors over a time period (e.g., the first time window). The first set of observations are obtained from memory or storage associated with the computer device implementing method 200 or another electronic device, server, database, or sensor.

The first window is a period of time such as a period of 1 s, 5 s, 60 s, 10 m, etc., and the size of the first set of observations is dependent on the sample rate and the sampling period. For example, an audio time-series signal for monitoring car engines is associated with a duration of 5 minutes, while a voltage trace for monitoring ion concentration in a fluid may be less than 5 minutes, and an image-based time-series signal such as a signal derived from a video for monitoring concrete deterioration may be much longer, such as several months in duration. In the example of a voltage trace for monitoring ion concentration in a fluid, 10 observations per second may be collected over a 2 minute window resulting in a set of 1,200 observations being obtained.

Step 206 comprises forecasting, using the first predictor, a first set of predicted observations within the first window. This results in each time point within the first window being associated with both an observation within the first set of observations (as obtained in step 204) and a predicted observation within the first set of predicted observations (as forecast by the first predictor in step 206). In other words, the first predictor forecasts a first set of predicted observations within the first window that can be compared to the obtained first set of observations.

For example, forecasting may comprise generating a first set of predicted observations based on a set of training observations within a training window. The training window is optionally a current real-time window or a historical window, based on using machine learning approaches. Beneficially, forecasting using a trained machine learning model results in improved accuracy, especially over longer time-periods, in comparison to predictions solely based on standard statistical modelling approaches.

Step 208, step 210 and step 212 comprise steps for determining whether to retrain the first predictor based on a difference between observations and predicted observations.

Step 208 comprises calculating a residual signal based on a difference between one or more observations of the first set of observations and one or more predicted observations of the first set of predicted observations. The residual signal is a measure of the deviation of the one or more predicted observations from the one or more obtained observations. The residual signal is based on the residual, the statistical error, or other metric associated with errors within predicted observations forecast by the first predictor.

For example, the residual signal may be based on the difference between the one or more predicted observations forecast in step 206 and a sample mean of the one or more observations obtained in step 204. In another example, calculating the residual signal comprises calculating the difference between an observation and predicted observation for each time point.

Optionally, step 208 further comprises smoothing the first set of observations and the first set of predicted observations, resulting in a smoothed set of observations and a smoothed set of predicted observations. Consequently, the residual signal is calculated from the smoothed set of observations and the smoothed set of predicted observations, allowing for overall trends to be compared and reducing the impact of noise on determining whether the first predictor requires retraining.

For example, if the time-series signal is a voltage trace associated with ion concentration in a fluid, step 208 comprises applying exponential smoothing independently to the first set of observations and to the first set of predicted observations. The first set of observations is optionally fit to a first exponential function and the first set of predicted observations is optionally fit to a second exponential function. Other example smoothing methods include application of Gaussian smoothing, moving averages, and/or any of the processes described in method 300 below.

Figure 5:
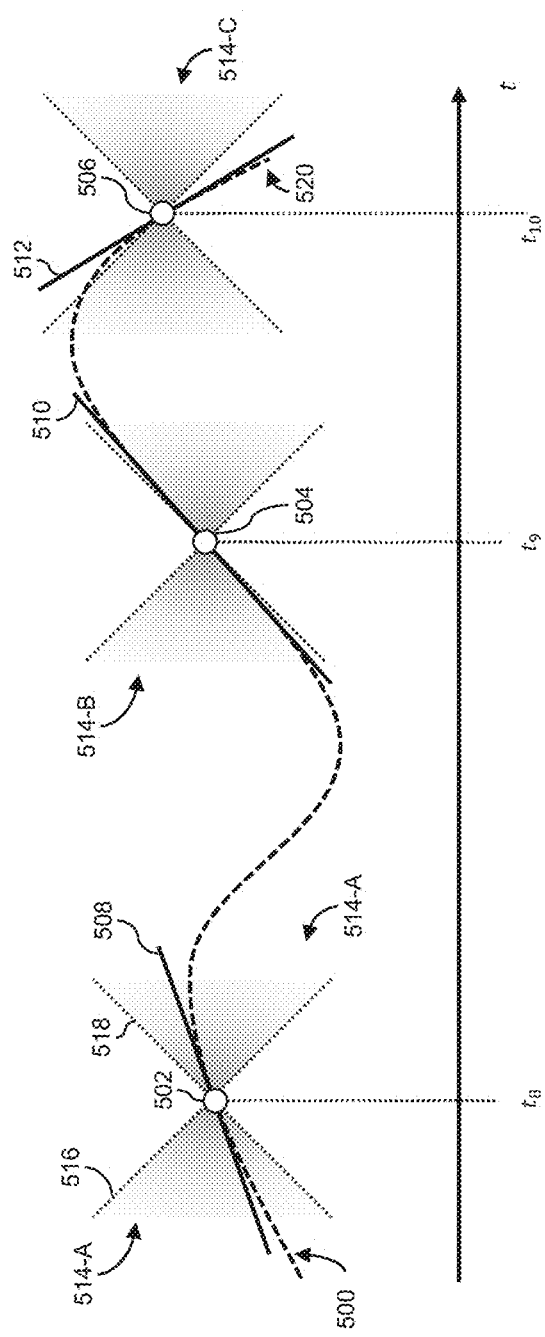
FIG. 5 shows a residual signal comprising a low degree of divergence and a high degree of divergence.

Step 210 comprises determining a gradient of the residual signal, as shown in FIG. 5 described below. The gradient is indicative of a degree of divergence between the first set of observations and the first set of predicted observations over the first window.

Determining the gradient of the residual signal is achieved using standard gradient calculations, such as differentiation of the residual signal with respect to time. The gradient is indicative of a degree of divergence between the first set of observations and the first set of predicted observations over the first window. For example, a gradient outside of a predetermined range is associated with one or more trends of the first set of predicted observations diverging from one or more trends of the first set of observations. The predetermined range is described in more detail in relation to step 212 below. Here, a trend is, for example, an upwards or downwards shift in the observations or predicted observations over time, or an approximate pattern of observation distribution. Consequently, larger gradients are associated with inaccurate predicted observations forecast by the first predictor in comparison with obtained observations.

Additionally, or alternatively, determining whether to retrain the first predictor comprises determining whether it is a suitable time for retraining the first predictor. For example, retraining the first predictor is postponed until a predetermined amount of computational resources are available at a computing device configured to retrain the first predictor. In another example, retraining the first predictor is postponed until a predetermined amount of training observations have been accumulated. The training observations used for retraining the first predictor comprise the first set of observations.

Step 212 comprises determining if the gradient is outside a predetermined range where, if the gradient is outside of the predetermined range, it is determined that the first predictor should be retrained and method 200 proceeds to step 214. If the gradient is inside of the predetermined range, it is determined that the first predictor should not be retrained, and the method proceeds to step 216.

As stated above in relation to step 208, to determine if a gradient is associated with predicted trends diverging, a predetermined range is used. A predetermined range therefore represents an allowable divergence between predicted observations forecast by the first predictor and obtained observations, and hence results in a predefined target quality being imposed on predicted observations. The predetermined range is one of: a static range (e.g., [−1, +1]); an adjustable range (e.g., [−(1−L), (1−L)]), where L represents a predetermined variable; time-dependent (e.g., [−(1−Lt), (1−Lt)]), where t represents time; and/or asymmetric, e.g. tailored to the first predictor and/or the set of training observations used to train the first predictor, such as <1.

If the gradient is outside the predetermined range, then the first predictor is forecasting predicted observations that diverge from the obtained observations thereby indicating that the first predictor may require retraining. Thus, when the gradient is determined to be outside of the predetermined range, the method 200 proceeds from step 212 to step 214.

If the gradient is within the predetermined range, then the first predictor is forecasting predicted observations of a target quality required for accurate anomaly detection (i.e., no retraining of the first predictor is deemed to be required). Thus, if the gradient is determined to be within the predetermined range, then the method 200 proceeds from step 212 to step 216.

Optionally, step 208, step 210, and step 212 are repeated, e.g., to continuously monitor the first predictor.

Step 214 comprises retraining the first predictor on the first set of observations thereby generating a retrained predictor. If the first predictor is a machine learning model, retraining comprises tuning the first predictor, e.g., using one-shot or few-shot learning techniques and/or using on observations obtained at step 204 above. In one example, retraining the first predictor comprises training the first predictor with one or more observations from the first set of observations for a small number of epochs, e.g., less than ten epochs, such as five epochs.

In another example, the gradient is associated with a failure of the first predictor, such as a failure to train on the set of training observations. For example, the gradient is outside a second predetermined range, preferably larger than the predetermined range of step 212 above, indicative of a training failure of the first predictor. Preferably, determining whether the gradient is outside the second predetermined range is performed at step 212. When the gradient is associated with a failure of the first predictor, step 214 comprises retraining the first predictor with one or more observations from the first set of observations and one or more observations from the set of training observations for a large number of epochs, e.g., greater than twenty epochs, such as fifty epochs. When the gradient is not associated with a failure of the first predictor, step 214 comprises retraining the first predictor on the first set of observations for a small number of epochs as described above.

Step 216 comprises obtaining a second set of observations of the time-series signal within a second window. Preferably, the second window is subsequent to the first window. The second set of observations represent a region of the time-series signal that may or may not comprise anomalies. The second set of observations are obtained from storage and/or memory or are obtained real-time from an electronic device or a sensor.

Step 218 comprises forecasting a second set of predicted observations within the second window. One or more time points within the second window are associated with an observation within the second set of observations and a predicted observation within the second set of predicted observations.

In other words, at least one predicted observation forecast by a predictor is associated with a corresponding time point of an observation of the second set of observations obtained in step 216. This allows for a comparison between the second set of observations and the second set of predicted observations. Alternatively, none of the predicted observation forecast by the predictor are associated with a corresponding time point of an observation of the second set of observations obtained in step 216. A direct comparison between the second set of observations and the second set of predicted observations is therefore not performed. A direct comparison between observations is not required for generating a confidence envelope and using the confidence envelope for anomaly detection, as detailed in steps 220 and 222 below.

The second set of predicted observations within the second window are forecast using the retrained predictor of step 214 if it is determined that the first predictor should be retrained in step 212. Alternatively, the second set of predicted observations is forecast without retraining the first predictor, i.e., step 214 is not performed for the reason that predicted observations forecast by the first predictor do not diverge from obtained observations as determined in step 212. Therefore, method 200 is more efficient over alternative forecasting methods as forecasting the second set of predicted observations within the second window without retraining the network prevents unnecessary use of computational resources and time.

In one example, the second window is subsequent to the first window such that the retrained predictor or first predictor is forecasting future observations. Optionally, the second window is longer in duration than the first window and/or comprises a greater number of observations.

Step 220 comprises generating a confidence envelope for the second window based on the second set of predicted observations, as discussed above in relation to FIG. 1. The confidence envelope is indicative of an expected variance of the second set of observations. For example, the confidence envelope is estimated based on an error rate of the first predictor; a probabilistic deviation of the second set of predicted observations; and/or a predetermined confidence value applied to the second set of predicted observations.

The confidence envelope is larger in a region of low confidence and smaller in a region of high confidence, and confidence is indicative of the probability that an observation will be within the confidence envelope. For example, predicted portions of the time-series signal with a high degree of variability between predicted observations is associated with a low confidence and a larger confidence envelope around that portion. In another example, predicted observations are less accurate and/or less precise as the second window progresses. A duration of time extending from "known" portions within the set of training observations increases as the second window progresses, resulting in an increase in the confidence envelope over time. Alternatively, the confidence envelope is time-independent, as shown in FIG. 1.

Step 222 comprises using the confidence envelope to determine if an outlier portion exists within the second window. The outlier portion comprises one or more observations of the second set of observations that are outside the confidence envelope. Observations outside of the confidence envelope represent individual observations or regions of the time-series signal that are anomalous. In other words, step 222 comprises performing anomaly detection within the second window of the time-series signal. See FIGS. 7 and 8 below for details on using the confidence envelope to determine if an outlier portion exists and replacing outlier portions respectively.

For example, an outlier portion is determined to exist within the prediction window if there exists a contiguous plurality of observations of the time-series signal which lie outside the confidence envelope. Here, a contiguous plurality of observations which lie outside the confidence envelope corresponds to a plurality of sequential observations which are temporally consecutive, and all lie outside of the confidence envelope. Alternatively, an outlier portion is determined to exist within the prediction window if a single observation of the time-series signal lies outside the confidence envelope. Here, an observation is considered to lie outside of the confidence envelope if it has a value (observation value) that is greater than the confidence envelope (i.e., greater than the upper envelope of the confidence envelope at the time point associated with the observation) or less than the confidence envelope (i.e., less than the lower envelope of the confidence envelope at the time point associated with the observation). As such, in some examples, the step 222 of determining if the outlier portion exists within the prediction window comprises the step of comparing the time-series signal to the confidence envelope such that an outlier portion is determined to exist when a portion of the time-series signal within the prediction window lies outside the confidence envelope.

The skilled person would understand that the above-described steps of method 200 are example implementations and method 200 may be performed such that steps are repeated and/or excluded. In one example, step 216 is performed after step 218 and 220. In another example, at least steps 208, 210, and 212 are repeated for monitoring the accuracy of the first predictor. As the accuracy decreases, the first predictor is retrained, which is repeated each time accuracy decreases (see FIG. 10 below for a detailed example of retraining the first predictor over time).

In another example, method 200 is expanded such that the first predictor forecasts a plurality of first sets of observations associated with a plurality of time-series signals, each first set of observations within a first window of each time-series signal. In other words, the first predictor forecasts observations associated with multiple different time-series signals. A benefit of using a first predictor comprising a deep learning model is that multiple independent or related time-series signal can be forecast by a single first predictor. For example, the first predictor is trained on a plurality of training sets, each training set comprising one or more training observations within a training window of each time-series signal. Multiple time-series signals forecast by a single first predictor increases the efficiency of the system and, where the time-series signals are related, can increase the accuracy of observations associated with at least one of the time-series signals (based on an increase in variables available to the first predictor). In other words, the first predictor is configured to generate multidimensional outputs in response to receiving multidimensional inputs.

The first predictor forecasts, for each time-series signal, at least one predicted observation for a given time point at step 206. The residual signal is calculated at step 208 for each time-series signal, and a gradient for each residual signal is determined at step 208. If one or more gradients are outside the predetermined range, the first predictor is retrained on a plurality of first sets of observations at step 214, thereby generating a retrained predictor. In another example, a predetermined number of gradients must be outside of the predetermined range for the first predictor to be retrained. For example. the predetermined number is one gradient, such as a specific gradient associated with a targeted redial signal; the predetermined number is the total number of gradients/time-series signals, where the first predictor would be diverging for each time-series signal; or a number in-between, such as half the total number of gradients/time-series signals.

In an example implementation of method 200 for improving outputs from a biomedical device, the time-series signal comprises time-series data collected from a polymer-based ion selective electrode (ISE) sensor. Therefore, the time-series signal comprises complex non-linear observations. Step 202 comprises obtaining a deep neural network trained on a set of historical time-series data. The historical data is collected from the polymer-based ISE or similar polymer-based ISEs over a historical time period and comprises a plurality of training observations. Each training observation is a sensor reading for a given time point within the historical time period. Step 204 comprises obtaining a first set of observations from the biomedical device. The first set of observations comprises sensor readings collected from the polymer-based ISE for a plurality of time points within a first window after the historical time period. Step 206 comprises forecasting, using the trained first predictor, a first set of predicted observations. The first set of predicted observations comprises predicted sensor readings for a plurality of time points within the first window, and the plurality of time points correspond to the plurality of time points of the first set of observations obtained in step 204. Due to noise associated with polymer-based ISE data, noise reduction is applied to both the first set of observations and the first set of predicted observations, such as using smoothing e.g. method 400 of FIG. 4.

Continuing with the same example, step 208 comprises calculating a residual signal based on a difference between the sensor readings collected from the polymer-based ISE and the predicted sensor readings forecast by the first predictor. The residual signal is therefore indicative of the difference between the first set of observations and the first set of predicted observations. Step 210 comprises determining a gradient of the residual signal, which indicates the degree of divergence between the first set of observations and the first set of predicted observations, e.g. for the final portion of the plurality of time points. In other words, determining the gradient of the residual signal is a step of determining whether the predicted sensor readings are diverging from sensor readings collected from the polymer-based ISE. This indicates whether the first predictor is predicting observations accurately. Step 212 comprises determining if the gradient is outside the predetermined range of $[-1, +1]$. In this example, the gradient is determined to be 1.25 for the final portion, and therefore the forecasted predicted observations are diverging from the observations obtained from the biomedical device. Step 214 comprises retraining the first predictor using the first set of observations obtained from the biomedical device for a few epochs. Retraining the first predictor increases the accuracy of the first predictor, updating the first predictor with new data not used during the original training.

Next, step 216 comprises obtaining a second set of observations, which are sensor readings collected from the polymer-based ISE for a plurality a subsequent time points to sensor readings collected at step 204. At step 218, the updated first predictor is used to forecast a second set of predicted observations, which represent predicted sensor readings over the same time period as the observations obtained in step 216. At step 220, a confidence envelope is generated based on a confidence value provided by the first predictor for each predicted observation. The confidence value is associated a calculated variability in potential predicted observations. At step 222, the second set of observations obtained at step 216 is compared to the confidence envelope generated at step 220. If the sensor readings collected from the polymer-based ISE are within the confidence envelope based on predicted sensor readings, it is determined that there are no outlier portions. If one or more sensor readings are outside of the confidence envelope, there could be an outlier portion comprising one or more anomalies. In order to use the second set of observations, the anomalies need to be removed and, preferably, replaced with non-anomalous data, such as predicted observations. For example, outlier portions are removed and replaced using method 300 of FIG. 3 below.

Figure 3:
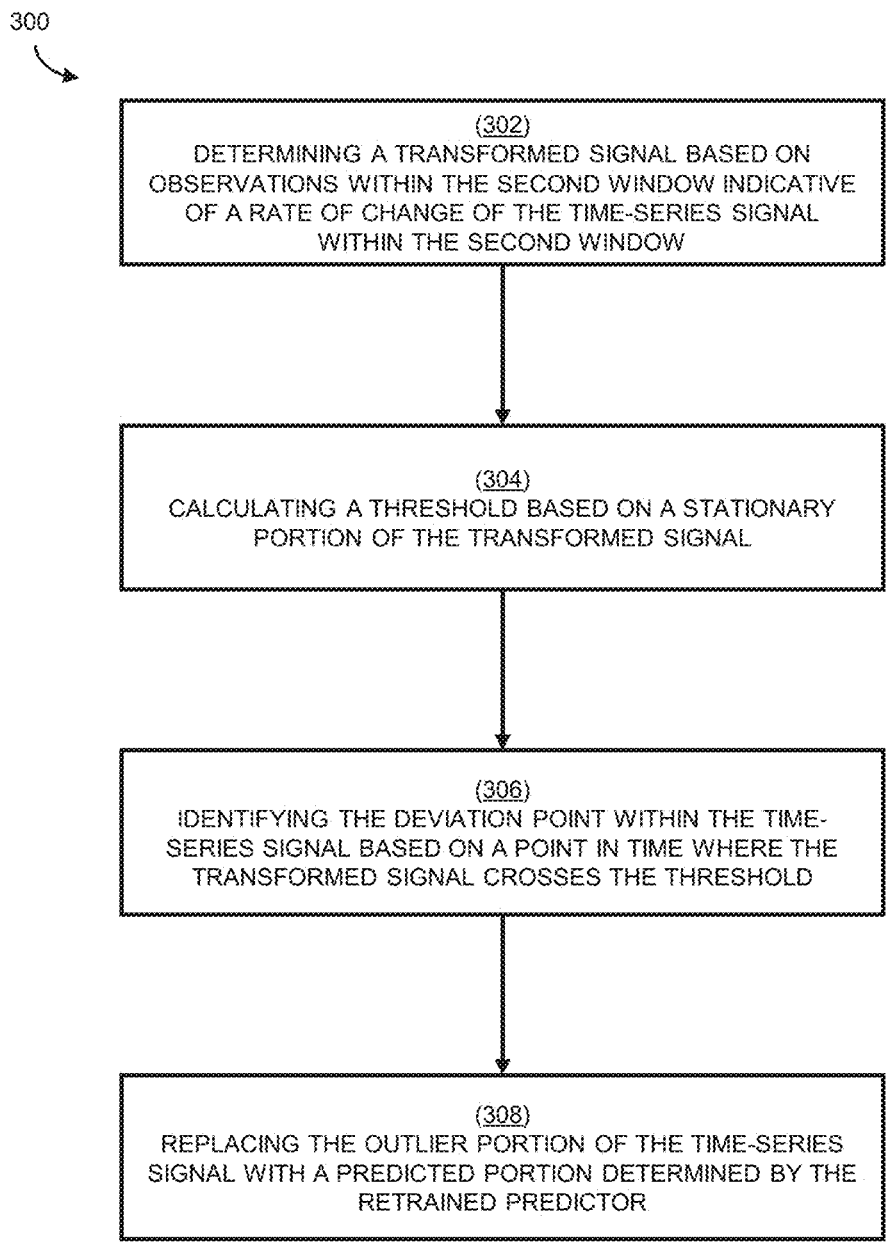
FIG. 3 shows a flow chart illustrating a computer-implemented method for determining a deviation point of an outlier portion.

FIG. 3 is a flow-chart illustrating method 300 for determining a deviation point of an outlier portion, such as deviation point 612 of FIG. 6 below and deviation point 712 of FIGS. 7A and 7B below. Method 300 is directed towards generating a corrected time-series signal that does not contain an anomaly detected in the time-series signal, such as detected using method 200. The corrected time-series signal can then be used for subsequent application and/or in retraining the first predictor without introducing data errors or other inaccuracies.

Method 300 comprises determining a deviation point for the outlier portion, the deviation point being associated with a point in time at which the outlier portion begins. Determining a deviation point comprises step 302, step 304, and step 306. Step 308 is an optional additional step to replace the outlier portion, thereby generating the corrected time-series signal. Step 302 comprises determining a transformed signal based on observations within the second window indicative of a rate of change of the time-series signal within the second window; step 304 comprises calculating a threshold based on a stationary portion of the transformed signal; step 306 comprises identifying the deviation point within the time-series signal based on a point in time where the transformed signal crosses the threshold; and step 308 comprises replacing the outlier portion of the time-series signal with a predicted portion determined by the retrained predictor.

The method 300 comprises the step 302 of determining a transformed signal based on observations within the prediction window of the time-series signal. The transformed signal is indicative of a rate of change of the time-series signal within the prediction window and is therefore determined from the time-series signal. Consequently, the time series signal and the transformed signal are temporally aligned such that both signals span the same time window. As will be described in more detail below, the transformed signal is utilised to identify the point in time in which the outlier portion starts (i.e. the deviation point) within the time-series signal.

The transformed signal is a transformation of the time-series signal that captures the rate of change, or acceleration, of the time-series signal. Whilst the present description relates to determining the deviation point from the entirety of the prediction window, the skilled person will appreciate that a sub-window thereof may also be used to identify the deviation point. For example, a window of a fixed size around the portion of the time-series signal which lies outside of the confidence envelope can be used to identify the deviation point. Thus, the present disclosure is not limited to estimating the deviation point using the entire prediction window.

The transformed signal corresponds to a derivative of the time-series signal, such as the first derivative of the time series signal. However, higher-order derivatives, such as the second order derivative, third order derivative, and the like, may additionally or alternatively be used to obtain the transformed signal from the time-series signal. The first derivative of the time-series signal may be calculated using a finite difference method. As is known, the finite difference method is used to approximate the derivative of a function from a set of data points when the exact formula for the function is not known. The finite difference method can also be used to calculate higher order derivatives such as the second derivative, third derivative, and the like. Alternatively, the first derivative may be calculated using symbolic differentiation, automatic differentiation, and the like.

Method 300 further comprises calculating 304 a threshold based on a stationary portion of the transformed signal. Although the transformed signal is generally non-stationary, portions of the transformed signal will be substantially stationary; that is, the statistical properties of the portion of the transformed signal will be relatively constant over time. The stationary portion of the transformed signal corresponds to any portion of the transformed signal which does not contain an outlier or anomaly. The stationary portion of the transformed signal is stationary because the statistical properties of the observations within the stationary portion are largely constant over time.

The stationary portion of the transformed signal has a length such that the stationary portion contains a set number of data points. Selecting the set number of data points to include within the stationary portion therefore determines the predetermined length. Preferably, the set number of data points is greater than or equal to 10, and more preferably is greater than or equal to 20. More preferably still, the set number of data points is greater than 30 but less than 100 and more preferably still is equal to 50. The stationary portion can then be identified using a sliding window approach whereby a window of the predetermined length (as described above) is placed over an initial portion of the transformed signal. If the data points within the window satisfy a stationarity criterion, then the portion is identified as the stationary portion. An example stationarity criterion is based on the mean and variance of sections of data within the window. The data points within the window may be split into sets (e.g. 2 sets, 4 sets, or 8 sets, etc.) and the mean and variance of the data points within each section may be calculated. The stationarity criterion may be met if the mean and variance across all sets is substantially the same, i.e. any change in the mean and variance is less than a predetermined, small, threshold value. If the stationarity criterion is not met, then the window is moved to a new position along the transformed signal. For example, the starting point of the window is incremented by a predetermined amount. The above process is then repeated until the stationarity criteria is met.

Alternatively, the stationary portion can be adaptively determined by identifying a starting point within the transformed signal (e.g. the first data point within the transformed signal) and iteratively increasing the number of data points to include within the stationary portion that are proximate the starting point. For example, the first iteration includes the first five data points, the second iteration includes the first six data points, the third iteration includes the first seven data points, and so on. A statistical measure is taken over all points within the stationary portion at each iteration. Example statistical measures include the mean value of all data points, the standard deviation, and the like. The iteration is terminated, and thus the identification of the stationary portion complete, once the statistical measure meets a termination criteria. For example, the termination criteria may be met when the difference between the statistical measure recorded across consecutive iterations is approximately zero.

The stationary portion is used to identify a threshold, or envelope. Generally, an envelope of a time-series signal corresponds to the boundary within which the time-series signal is substantially contained. The envelope of a time-series signal therefore includes an upper envelope, or upper threshold, and a lower envelope, or lower threshold. The upper threshold corresponds to a sequence of data points, or a curve, outlining the upper extreme of the signal, whilst the lower threshold corresponds to a sequence of data points, or a curve, outlining the lower extreme of the signal. The envelope of the observations within the stationary portion is based on a standard deviation calculated from observations within the stationary portion. Optionally, a moving average and moving standard deviation can be utilised to determine the envelope. In an alternative example, the envelope corresponds to a Bollinger-Band.

The threshold calculated at the step of calculating 304 in the method 300 corresponds to the upper envelope, or upper threshold, of the envelope calculated for the observations within the stationary portion. Although the threshold is determined using only a portion of the transformed signal (e.g. the observations of the transformed signal within first predicted time-series signal 706 of FIG. 7 below), the threshold is defined across the entire prediction window. The threshold is extended across the prediction window by setting the maximum value of the upper envelope as a scalar threshold. Alternatively, the threshold is extended across the prediction window by setting a given value (e.g., the average value, minimum value, starting value, ending value, etc.) of the upper envelope as a scalar threshold.

Once the threshold has been determined, it is used to identify the deviation point within the time-series signal.

Method 300 further comprises at step 306 identifying the deviation point within the first signal based on a point in time where the transformed signal crosses the threshold. The transformed signal has a deviation point at a time point and has been processed such that all negative observations have been zeroed.

The deviation point is associated with the time point where the transformed signal crosses the threshold. In one example, the deviation point within the transformed signal is identified by iterating along the transformed signal in the reverse temporal direction to identify the time point where the transformed signal crosses the threshold (i.e. is below the threshold). The traversal begins at the value that corresponds to a time point equal to the point in time at which the time-series signal crosses the confidence envelope. Thus, the value is at a time point corresponding to the time point associated with the first point 708 of the time-series signal 702 shown in FIG. 7.

Given that the transformed signal may cross the threshold multiple times, the deviation point within the transformed signal is identified based on the time point where the transformed signal crosses the threshold proximate the value. Put another way, the deviation point corresponds to a crossing of the transformed signal and the threshold which is temporally closest to the value.

As an alternative to the above iterative approach, the deviation point is identified using a piecewise operation. If the transformed signal is represented by a one dimensional vector, then a piecewise operation can be applied to the vector to identify only those values which are below the threshold. For example, all values of the one-dimensional vector which are not less than the threshold can be zeroed. The deviation point within the transformed signal is then identified as the temporally closest non-zero value to time point associated with the value in the reverse temporal direction.

Whilst the above description relates to identifying the deviation point within the transformed signal, the deviation point within the original time series signal is identified as the data point within the time-series signal having a time value equal to the time point. Beneficially, the deviation point detection process described above provides an accurate and efficient mechanism for identifying the start of the outlier portion. This allows the outlier portion to be more accurately replaced, for example using step 308.

Step 308 comprises replacing the outlier portion of the time-series signal with a predicted portion, the predicted portion determined by the retrained predictor and based on observations within the second window that are not within the outlier portion. Alternatively, step 308 comprises the predicted portion determined by a different predictor from the retrained predictor, such as the first predictor, and based on observations within the second window that are not within the outlier portion. Step 308 is an optional step in method 300 as step 308 does not require steps 302 to 306 to be performed. In one example, step 308 follows step 214 of method 200. In another example, step 308 follows step 318 of method 300. In a further example, step 308 is performed subsequent to detection that the residual gradient of method 300 is outside the predetermined range, representing a high degree of divergence and therefore indicative of an outlier portion, such as shown in FIG. 5 below.

Figure 4:
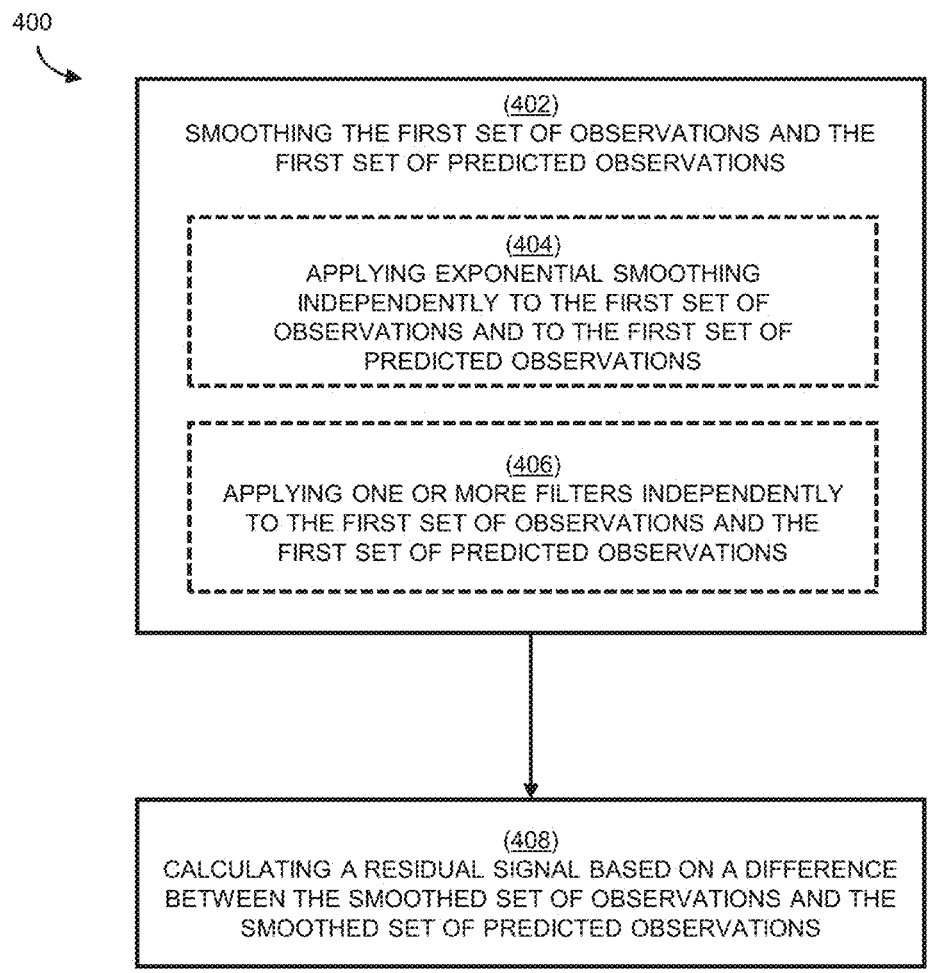
FIG. 4 shows a flow chart illustrating a computer-implemented method for calculating a residual signal.

FIG. 4 shows a flow chart illustrating a method 400 for calculating a residual signal. Method 400 is directed to improving accuracy in determining whether to retrain the first predictor, as described above. Method 400 comprises step 402, which further comprises step 404 and/or step 406, and step 408. Step 402 comprises smoothing the first set of observations and the first set of predicted observations; step 404 comprises applying exponential smoothing independently to the first set of observations and to the first set of predicted observations; step 406 comprises applying one or more filters independently to the first set of observations and the first set of predicted observations; and step 408 comprises calculating a residual signal based on a difference between the smoothed set of observations and the smoothed set of predicted observations.

Step 402 comprises smoothing the first set of observations and the first set of predicted observations, thereby generating a smoothed set of observations and a smoothed set of predicted observation. The residual signal, such as residual signal 700 of FIG. 7 below, is calculated from the smoothed set of observations and the smoothed set of predicted observations, such that the first predictor is not retrained unnecessarily as disclosed above. Smoothing the first set of observations results in a smoothed time-series signal approximating the time-series signal, such that the smoothed time-series signal attempts to capture important patterns without noise or other fine-scale variance that is not significant to determining anomalies. Optionally, smoothing comprises curve fitting.

Step 404 comprises applying exponential smoothing independently to the first set of observations and to the first set of predicted observations. Applying exponential smoothing independently keeps alterations to the first set of observations from altering the first set of predicted observations or vice versa. In one example, only the first set of observables is smoothed, e.g. the first predicted model is trained to forecast a first set of predicted observations without excess variation and/or noise. Applying exponential smoothing comprises, for example, applying one or more filters to the first set of observations or fitting the first set of observations to one or more exponential functions. Exponential smoothing is one example of smoothing specifically relevant to exponential-related time-series signals, such as the aforementioned voltage trace indicative of ion concentration as described above.

Step 406 comprises applying one or more filters independently to the first set of observations and the first set of predicted observations. The filters result in smoothing of the first set of observations and/or the first set of predicted observations and the filters are not limited to exponential smoothing. Examples include linear smoothers, convolution, moving average, logical regression, low-pass filter, or other known smoothing and/or filter methods depending on the time-series signal and levels of variation and/or noise.

Step 408 comprises calculating a residual signal based on a difference between the smoothed set of observations and the smoothed set of predicted observations, such as using step 208 of method 200. Alternatively, if only the first set of observations has been smoothed, the residual signal is calculated based on a difference between the smoothed set of observations and the first set of predicted observations.

Beneficially, method 400 results in more accurate detection of the deviation point, which allows for first predictor to be used for anomaly detection until forecasted predicted observations diverge from obtained observations. Efficiency is increased as the first predictor is not retrained unnecessarily, and accuracy is increased by retraining the first predictor as soon as divergence is (accurately) detected. Example improvements are further shown in FIG. 8 below.

FIG. 5 shows a residual signal 500, a first point 502, a second point 504, a third point 506, a first gradient line 508, a second gradient line 510, a third gradient line 512, low divergence regions 514-A, 514-B, and 514-B, a negative gradient boundary 516, a positive gradient boundary 518, and a diverging residual signal 520.

The residual signal 500 comprises a low degree of divergence and a high degree of divergence. A gradient of the residual signal 500 is determined at a first point 502, a second point 504, and a third point 506, shown by a first gradient line 508, a second gradient line 510, and a third gradient line 512. A predetermined range, e.g. between −1 and +1, is illustrated by low divergence regions 514-A, 514-B and 514-C. The low divergence regions 514 illustrate regions between a negative gradient boundary 516 and a positive gradient boundary 518. In this example, a portion of the residual signal 700 the residual signal comprises a diverging residual signal 520, which is associated with a gradient (the third gradient line 512) indicative of a high degree of divergence.

The residual signal 500 is calculated using, for example, step 208 of method 200 above. A gradient of the residual signal 500 is determined using, for example, step 210 of method 200 above. Determining the gradient is not limited to the three points 502, 504, and 506 shown in FIG. 5, as the gradient at any time point can be determined, e.g. using standard mathematical methods such as derivation of the residual signal 500 with respect to time.

The gradient at the first point 502 shown by the first gradient line 508 is within the predetermined range, as shown by the first gradient line 508 being within the low divergence region 514-A. The gradient at the second point 504 shown by the second gradient line 510 is greater than the gradient at the first point 502 but is still within the predetermined range, as shown by the second gradient line 510 being within the low divergence region 514-B. The gradient at the third point 506 shown by the third gradient line 512 is negative but greater in magnitude than the gradient at the second point 504. Additionally, the gradient is not within the predetermined range, as shown by the third gradient line 512 being outside of the low divergence region 514-C. Consequently, the third point 506 is indicative of a region of diverging residual signal 520.

As the gradient at point 506 is not within the predetermined range, the predicted observations and obtained observations are diverging at this region. This indicates either that the predicted observations are diverging from obtained observations such that the first predictor requires retraining or that the obtained observations are diverging from the predicted observations such that there is an outlier portion in the time-series signal.

However, if the time-series signal comprises noise or a sensor associated with the time-series signal has relatively low precision, or is otherwise highly variable over time, the calculated residual signal 500 may be highly variable. In the event that the time-series signal and/or residual signal 500 is highly variable, the gradient may also be highly variable and hence a gradient outside of the predetermined range may not be indicative of a degree of divergence as required. Applying smoothing to the first set of observations of the time-series signal, such as based on the variance of the time-series signal over time, results in a residual signal more indicative of divergence, further resulting in improved efficiency as the first predictor is not retrained unnecessarily. One example method for applying smoothing is described in relation to FIG. 4 above.

Figure 6:
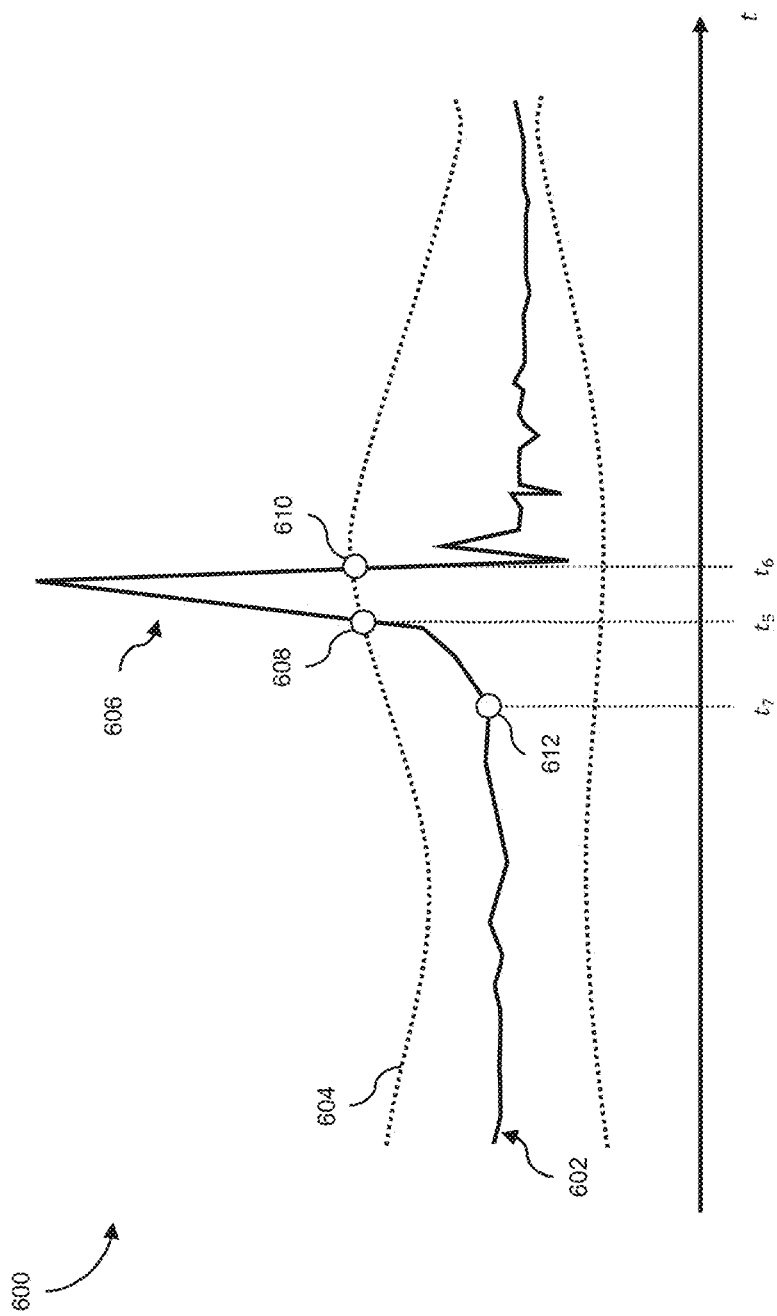
FIG. 6 shows a time-series signal comprising an outlier portion having a deviation point.

FIG. 6 shows a plot 600 of a time-series signal 602, a confidence band 604, an outlier portion 606, a first point 608, a second point 610, and a deviation point 612.

The time-series signal 602 can be compared to a confidence band 604, which comprises the confidence envelope of, for example, method 200. An outlier portion 606 of the time-series signal 602 corresponds to a contiguous plurality of observations of the time-series signal 602 which lie outside the confidence band 604. Specifically, the outlier portion 606 corresponds to the plurality of observations of the time-series signal 602 between a first point 608 and a second point 610. A deviation point 612 corresponds to the time at which the outlier portion 606 begins. That is, whilst the outlier portion 606 is identifiable from the observations of the time-series signal 602 which lie outside of the confidence band 604, the outlier portion 606 captures an underlying anomaly which begins at a point prior to the time at which the time-series signal 602 crosses the confidence band 604. This can be seen from the portion of the time-series signal 602 between the deviation point 612 and the first point 608. Consequently, limiting the anomaly to the portion of the time-series signal 602 occurring between the first point 608 and the second point 610 does not adequately capture the full characteristic of the anomaly. This may introduce errors or discontinuities in the replacement portion of the time-series signal as illustrated in FIG. 7A.

Figure 7B:
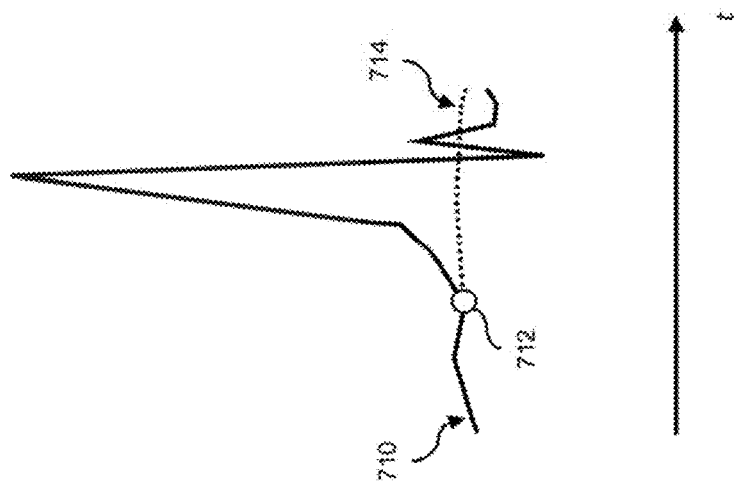
FIGS. 7A and 7B show a time-series signal and a first predicted time-series signal with and without a discontinuity.
Figure 7A:
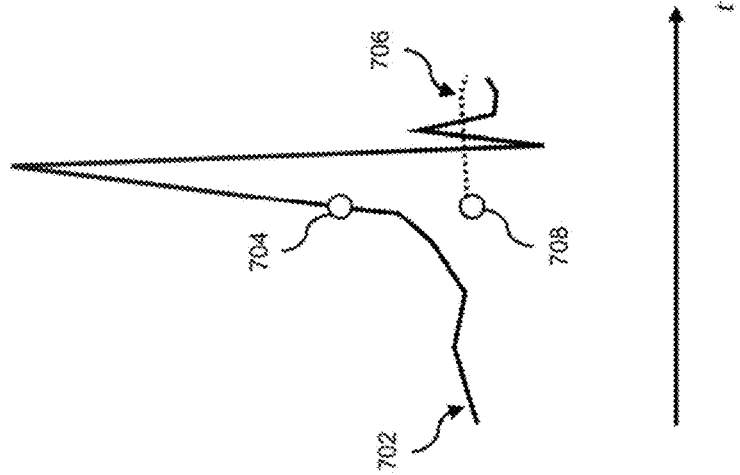

FIG. 7A shows a time-series signal 702 and a first predicted time-series signal having a discontinuity. FIG. 7A comprises a time-series signal 702, a first point 704, a first predicted time-series signal 706, and a starting point 708.

The time-series signal 702 corresponds to a portion of the time-series signal 602 shown in FIG. 6. The time-series signal 702 is shown up to the first point 704 which corresponds to the first point 608 shown in FIG. 6. A first predicted time-series signal 706 is shown beginning at a starting point 708 which corresponds in time to the first point 704. The first predicted time-series signal 706 corresponds to a time-series signal obtained from a predictor trained on a training window terminating at the first point 704. The prediction window begins at the first point 704. As shown, there is a discontinuity between the time-series signal 702 which terminates at the first point 704 and the first predicted time-series signal 706 which begins at the starting point 708.

In contrast, the present disclosure exploits the deviation point of the outlier portion to overcome the above problems with signal discontinuity. This is illustrated in FIG. 7B.

FIG. 7B shows a time-series signal 710 and a second predicted time-series signal without a discontinuity. FIG. 7B comprises a time-series signal 710, a deviation point 712, and a second predicted time-series signal 714.

The time-series signal 710 corresponds to a portion of the time-series signal 602 shown in FIG. 6 which is the same as the portion of the time-series signal 702 shown in FIG. 7A. The time-series signal 710 is shown up to a deviation point 712 which corresponds to the deviation point 612 shown in FIG. 6. A second predicted time-series signal 714 is shown beginning at the deviation point 712. The second predicted time-series signal 714 corresponds to a time-series signal obtained from a predictor trained on a training window terminating at the deviation point 712. Consequently, the prediction window begins at the deviation point 712. Because the outlier portion is fully contained within the prediction window, the replacement of the outlier portion of the time-series signal with the second predicted time-series signal 714 does not introduce a discontinuity. As such, identifying the deviation point of the outlier portion allows a more accurate process for filtering the anomaly within the time-series signal.

Figure 8:
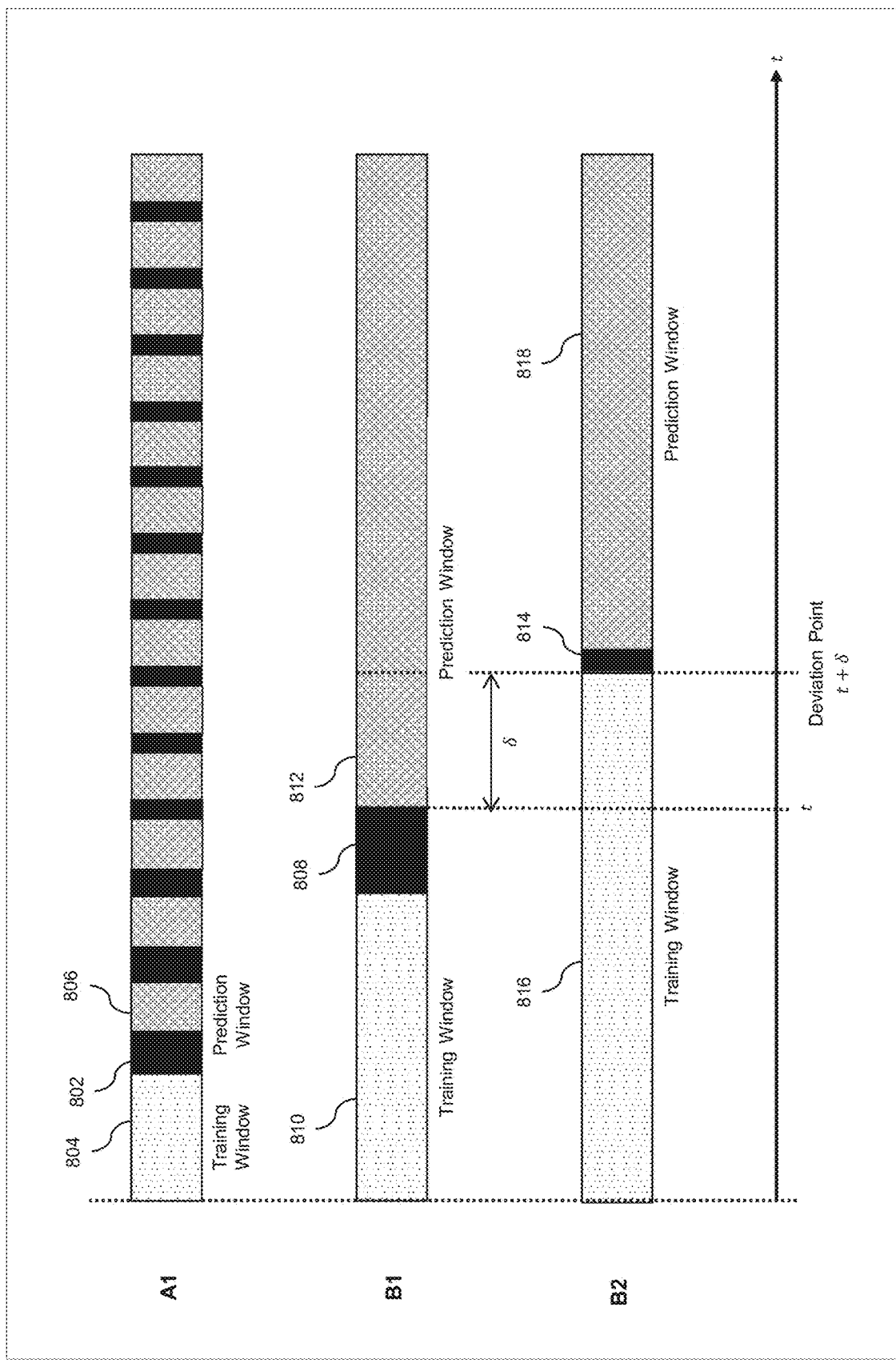
FIG. 8 illustrates training windows and prediction windows associated with different anomaly detection models.

FIG. 8 illustrates training windows and prediction windows associated with different anomaly detection models. The two example models compared are model A1 and model B1, and model B2 represents a retrained model B1. FIG. 8 comprises a first training block 802, a first training window 804, a first prediction window 806, a second training block 808, a second training window 810, a second prediction window 812, a third training block 814, a third training window 816, and a third prediction window 818.

Model A1 represents a traditional statistical method for anomaly detection, where the model A1 is trained at the first training block 802 using data from training window 804, such as a set training observations within the first training window 804. Model A1 forecasts predicted data within the first prediction window 806, such as a first set of predicted observations within the first prediction window 806. Model A1 is a small, relatively simple model to increase efficiency, so less training data is required (e.g., compared to deep learning models) and hence the first training window 804 is small. The first training block 802 is small as the duration of training is relatively short, as is the duration of prediction, which means that the first prediction window 806 must be small to maintain accuracy. As model A1 is a simple model, model A1 cannot accurately forecast observations far from observations associated with the training window. Consequently, model A1 must frequently retrain, which reduces the efficiency over time. Therefore, even though model A1 represents an initial efficiency increase from use of a simple model, overall, an approach for anomaly detection using model A1 results in poor efficiency and accuracy over time.

Model B1 represents an advanced model for anomaly detection, such as the first predictor of method 200, and model B1 is trained at the second training block 808 using training observations within the second training window 810. Model B1 is configured to forecast predicted observations within the second prediction window 812. Model B1 is a larger, more complex model than model A1, such as a deep learning model. Therefore, more training data is required to initially train model B1, and the initial training duration is longer, hence the second training window 810 is larger than the first training window 804, and the second training block 808 is larger than the first training block 802. However, as model B1 is more complex, model B1 is able to accurately forecast prediction observations over a longer duration, and the second prediction window 812 is larger than prediction window 806.

If the predicted observations forecast by model B1 begins to deviate from "true" observations (e.g., the observations obtained at step 204 of method 200) at a deviation point, model B1 is retrained, thereby generating model B2. Model B2 uses observations up to the deviation point, either true observations or predicted observations, as training data to retrain at the third training block 814. The third training block 814 is smaller than the second training block 808, as retraining requires less epochs than the initial training. Optionally, model B2 uses all previous observations, such that training window is increased until the deviation point, shown by the third training window 816. Due to the additional training data and retraining, model B2 can forecast predicted observations over a longer duration, and the third prediction window 818 is larger than the second prediction window 812. Alternatively, the duration of the third prediction window 818 is amended based on the duration of time δ within the second prediction window 812 before predicted observations deviated from true observations.

Figure 9:
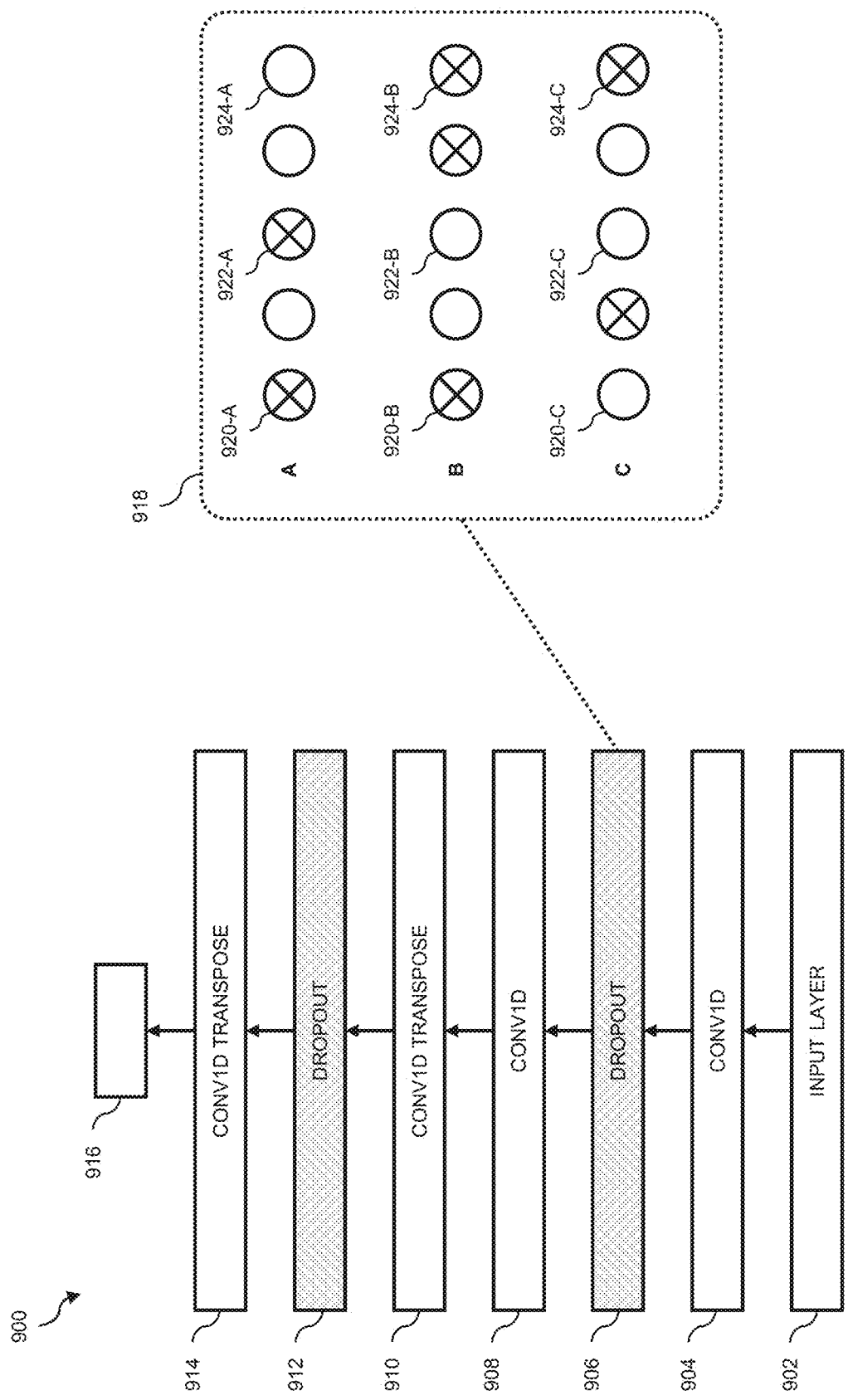
FIG. 9 shows a predictor corresponding to a convolution neural network.

One example of model B1 is detailed in relation to FIG. 9 below. FIG. 9 shows model B1 corresponding to a convolution neural network 900.

The convolutional neural network 900 comprises an input layer 902, a first 1D convolution layer 904, a first dropout layer 906, a second 1D convolution layer 908, a first transposed convolution layer 910, a second dropout layer 912, and a second transposed convolution layer 914. The second transposed convolution layer 914 outputs an output value 916. FIG. 9 further shows a dropout process 918 performed at the first dropout layer 906. The dropout process 918 shows the states (A, B, C) of a first unit 920, a second unit 922, and a third unit 924 of the first dropout layer 906.

In some examples, the first predictor and/or the retrained predictor of method 200 and/or method 300 correspond to the convolutional neural network 900 shown in FIG. 9.

The input layer 902 comprises a number of units corresponding to the number of observations to use. For example, the input layer 902 may comprise 260 units corresponding to 260 observations which, when sampled at 250 ms, is approximately equal to 3 minutes of historical data The first 1D convolution layer 904 corresponds to a hidden layer with 32 filters, a convolution window size (i.e., kernel size) of 7, and a stride length of 2. The first dropout layer 906 has a dropout rate of 0.2 and is described in more detail below.

The second 1D convolution layer 908 corresponds to a hidden layer with 16 filters, a kernel size of 7, and a stride length of 2. The first transposed convolution layer 910 corresponds to a hidden layer with 16 filters, a kernel size of 7, and a stride length of 1. The second dropout layer 912 has a dropout rate of 0.2. The second transposed convolution layer 914 has 1 filter, a kernel size of 7, and uses even zero-padding. The first 1D convolution layer 904, the second 1D convolution layer 908, and the first transposed convolution layer 910 use even zero-padding (i.e., the input is padded evenly with zeros such that the output has the same dimension as the input) and a ReLU activation function.

Dropout layers, such as the first dropout layer 906 and the second dropout layer 912, randomly deactivate units within a layer of a neural network. When used during training, dropout helps prevent overfitting. However, dropout may also be used during prediction (i.e., after the neural network has been changed) to obtain multiple predictions from the space of all available models. That is, the use of dropout can be interpreted as a Bayesian approximation of a Gaussian process. Each time dropout is applied, different units are dropped out resulting in slightly different networks being obtained. The predictions obtained from the different networks can be treated as Monte Carlo samples from the space of all available networks (i.e., all available models). This allows an approximation of the model's uncertainty to be obtained for a prediction. This is illustrated in the dropout process 918 shown in FIG. 9.

Once the convolutional neural network 900 is trained, the first dropout layer 906 and the second dropout layer 912 randomly set inputs received from the first 1D convolution layer 904 and the first transposed convolution layer 910 to zero each time a prediction is obtained from the convolutional neural network 900. When obtaining a first prediction, the first dropout layer 906 is in a first state "A" such that the first unit 920-A and the second unit 922-A are set to zero whilst the third unit 924-A is left unchanged (although a scaling operation is typically applied to ensure that the sum over all inputs remains unchanged during the dropout process). When obtaining a second prediction, the first dropout layer is in a second state "B" such that the first unit 920-B and the third unit 924-B are set to zero whilst the second unit 922-B is left unchanged. When obtaining a third prediction, the first dropout layer 906 is in a third state "C" such that only the third unit 924-C is set to zero whilst the first unit 920-C and the second unit 922-C are left unchanged. Because each prediction involves different units the predictions will differ.

Obtaining multiple predictions thus allows a confidence band to be obtained from the multiple predictions since the convolutional neural network 900 operates as a Bayesian predictor. The confidence band thus corresponds to a Bayesian approximation of uncertainty associated with predictions produced by the deep learning model (e.g., by the convolution neural network 900) based on observations within the prediction window of the time-series signal.

Further examples of training convolutional neural network 900 are detailed in FIG. 10 below.

Figure 10:
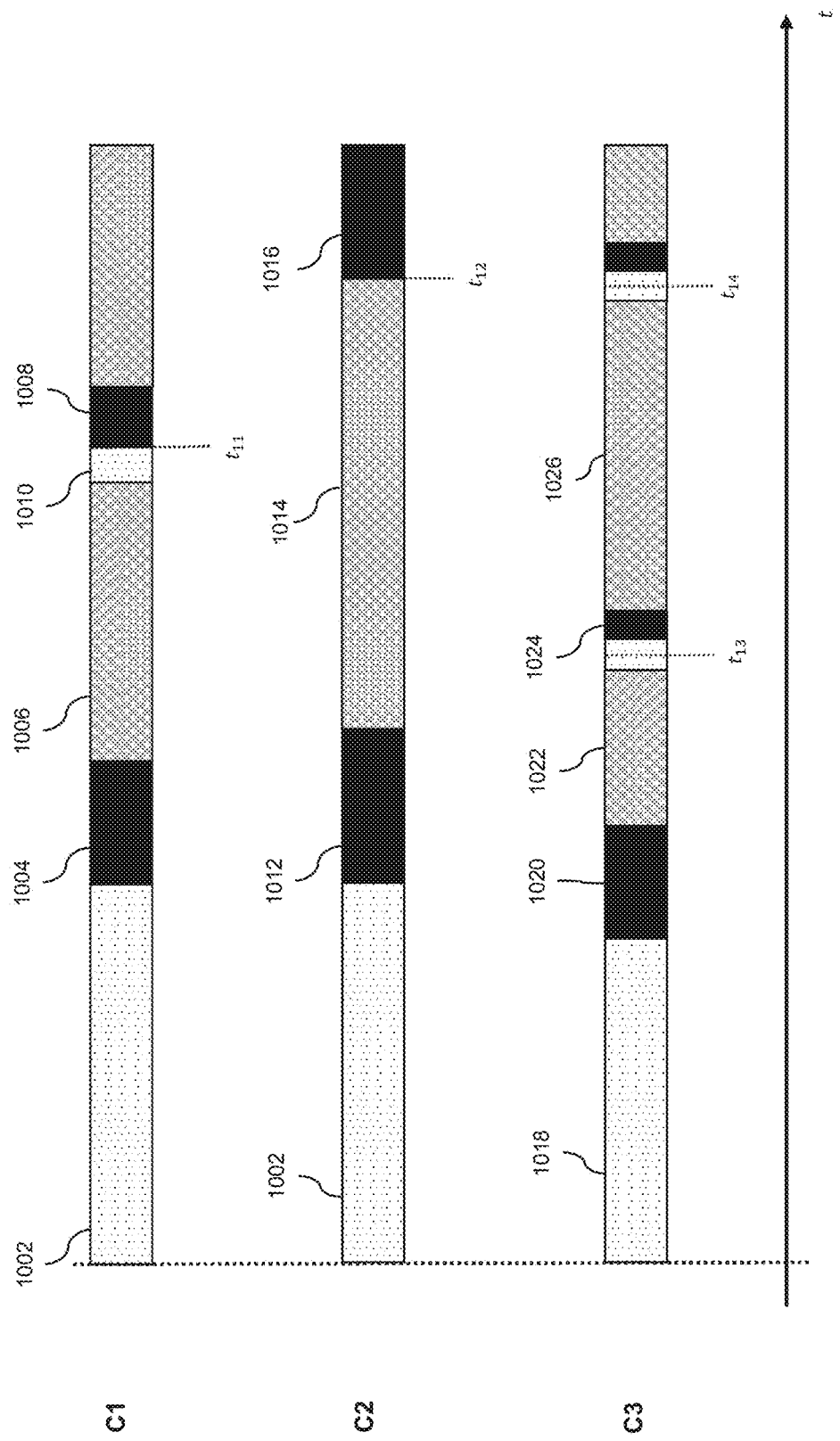
FIG. 10 illustrates training windows and prediction windows associated with retraining a first predictor based on a residual gradient being outside a predetermined range.

FIG. 10 illustrates training windows and prediction windows associated with retraining a first predictor based on a residual gradient being outside a predetermined range. FIG. 10 comprises a first training window 1002, a first training block 1004, a first prediction window 1006, a second training block 1008, a second training window 1010, a third training block 1012, a third prediction window 1014, a fourth training block 1016, a fifth training window 1018, a fifth training block 1020, a fifth prediction window 1022, a sixth training window 1024, a sixth training block 1024, and a sixth prediction window 1026.

Three example approaches to training the first predictor, such as convolutional neural network 900 of FIG. 10, are illustrated (C1, C2, and C3), although the skilled person would understand that alternative approaches to training and retraining the first predictor can be applied to, for example, method 200 of FIGS. 2A-2B.

Training approach C1 incorporates using training data within the first training window 1002 during the first training block 1004 to forecast predicted data within the first prediction window 1006, which ends when a deviation point is detected at a first time point $t_{11}$. The first predictor is retrained during the second training block 1008 using new training data within the second training window 1010, and the second training window 1010 is a predetermined duration before the first time point.

Training approach C2 incorporates using training data within the first training window 1002 during the third training block 1012 to forecast predicted data within the third prediction window 1014, which ends when a deviation point is detected at a second time point $t_{12}$. The first predictor is retrained during the fourth block 1016, where any and/or all data within the third prediction window 1014 is used as additional training data. As longer is spent training using approach C2, resulting prediction windows can potentially be longer in duration without losing accuracy.

Training approach C3 incorporates using training data within the fifth training window 1018 during the fifth training block 1020 to forecast predicted data within the fifth prediction window 1022, which ends when a deviation point is detected at a third time point $t_{13}$. The first predictor is retrained during the sixth training block 1024. Optionally, data within a training window around the third time point is used during retraining. As increased data around the deviation point is made available to the first predictor, the retrained predictor is potentially more accurate, and the sixth prediction window 1026 is longer than the fifth prediction window 1022. The sixth prediction window 1026 ends when a deviation point is detected at a fourth time point $t_{14}$, at which point the retraining process is repeated.

By using the method 200 to generate and train a predictor, e.g., using the training approaches of FIG. 10, and method 300 to replace outlier portions of a time-series signal using the trained predictor, an improved time-series signal may be obtained. This improved signal may then be used to improve operation and control of one or more devices. Without accounting for and correcting anomalous regions in the above-described manner, the anomalous regions appear as false positive or false negative readings that may hinder operation of a device. For example, in some biomedical applications it is important to obtain a baseline reading of a sensor during a calibration phase to provide accurate comparisons with readings obtained during a measurement phase. However, anomalies appearing in the time-series signal during the calibration phase (e.g., due to bubbles being present within the calibration fluid) may lead to an incorrect or inaccurate baseline measurement being obtained thus resulting in inaccurate comparisons with readings obtained during the measurement phase. By identifying and removing such anomalies using the method 300, the device operates in an improved way by enabling improved accuracy of sensor readings during the measurement phase. This is illustrated by the device shown in FIGS. 11A and 11B below.

Figure 11B:
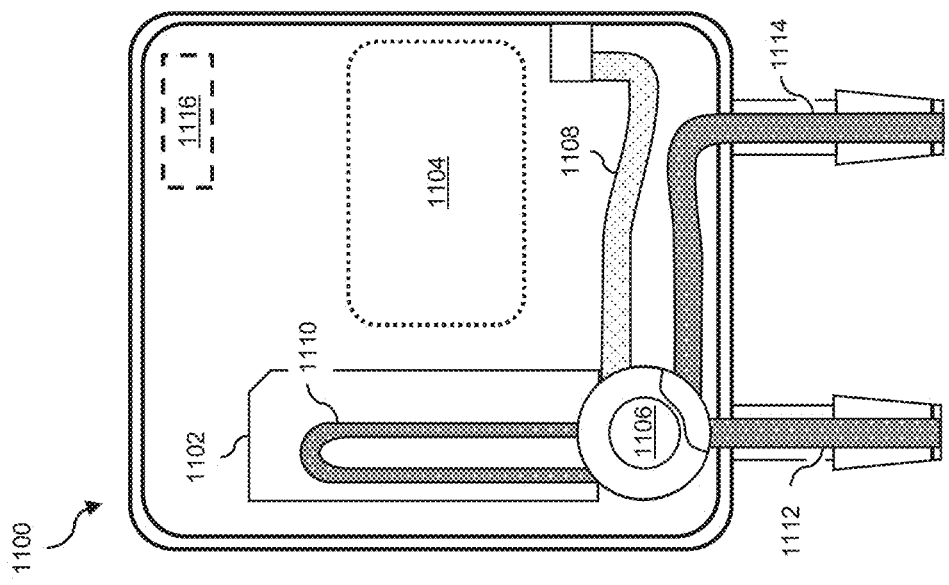
FIGS. 11A and 11B show a device according to an aspect of the present disclosure.
Figure 11A:
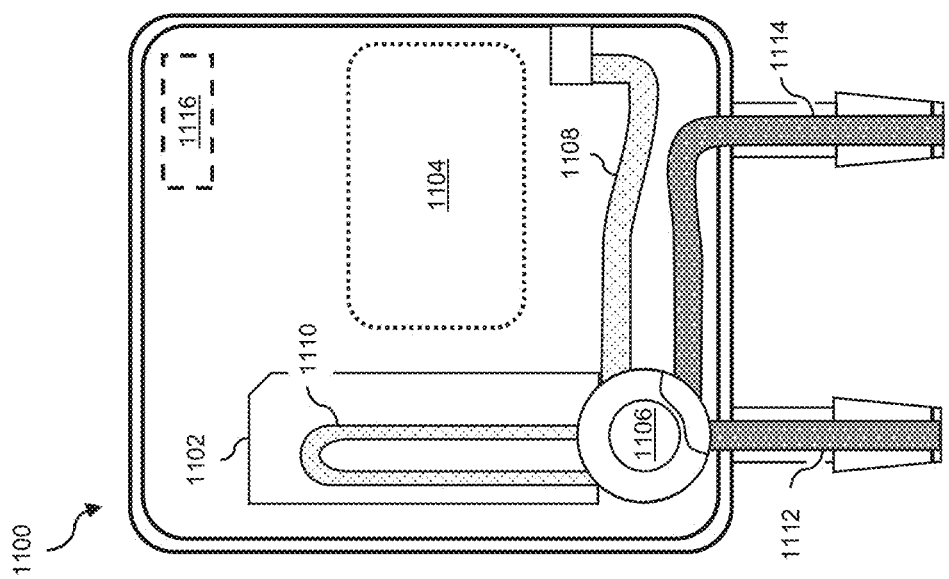

FIGS. 11A and 11B show a device 1100 (i.e. controllable system) comprising a sensor 1102, a reservoir 1104, and a valve 1106. A first fluid channel 1108 connects the reservoir 1104 and the valve 1106. A second fluid channel 1110 passes through and over the sensor 1102 from the valve 1106. A fluid inlet 1112 and a fluid outlet 1114 are both connected to the valve 1106. The device 1100 optionally comprises a control unit 1116.

The sensor 1102 is a polymer-based ISE. As is known, an ISE provides spot monitoring by converting the activity of an ion dissolved in a solution to electrical potential. ISEs are widely used within the fields of medicine, biology, and analytical chemistry. Typical applications include using an ISE in biomedical devices to measure the concentration of calcium, potassium, and sodium in bodily fluids such as blood, and using an ISE for pollution monitoring by measuring the concentration of fluorine, copernicium, etc. in water.

In use, the sensor 1102 is typically "flushed" with a calibration fluid before being exposed to an unknown fluid from which measurements are to be take. The calibration fluid flows from the reservoir 1104 through the first fluid channel 1108 to the valve 1106. The calibration fluid flows back to the reservoir 1104 through a further fluid channel. Alternatively, the calibration fluid flows back to the reservoir 1104 through the first fluid channel 1108. The unknown fluid flows from an external source (not shown) through the fluid inlet 1112 to the valve 1106 and from the valve 1106 through the fluid outlet 1114 to be further disposed of (e.g. flows to waste).

The valve 1106 is controlled by an external controller, such as the control unit 1116, or an external computing device. Configuration settings of the valve 1106 are adjusted by means of the external controller. Specifically, commands are sent to the device 1100 to control actuation of the valve 1106.

In a first mode of operation (FIG. 11A), also referred to as a calibration phase, the valve 1106 is configured to allow the calibration fluid to flow from the reservoir 1104 through the first fluid channel 1108 to the second fluid channel 1110. The sensor 1102 then takes reference measurements from the calibration fluid flowing through the second fluid channel 1110.

In a second mode of operation (FIG. 11B), also referred to as a measurement phase, the valve 1106 is configured to allow the unknown fluid to flow from the external source (not shown) through the fluid inlet 1112 to the second fluid channel 1110. The sensor 1102 then takes measurements from the unknown fluid flowing through the second fluid channel 1110. The unknown fluid passes from the second fluid channel 1110 to the fluid outlet 1114 and out of the device 1100.

The sensor 1102 responds differently to the two fluids. The response of the sensor 1102 is measured as a voltage developed between the inside and the outside of the ion sensitive membrane of the sensor 1102. The time-series signal of the change in voltage received from the sensor 1102 over time will capture the transition of the sensor 1102 from measuring the calibration fluid to measuring the unknown fluid.

Bubbles within the fluid channels, particularly within the second fluid channel 1110, will lead to anomalous readings being recorded by the sensor 1102 (with bubbles appearing as sharp "spikes" within the time-series signal, such as the outlier portion 110 within the time-series signal 102 shown in FIG. 1). Such anomalies occurring during the calibration phase may lead to the device 1100 (specifically the sensor 1102) being incorrectly calibrated. For example, the sensitivity of the sensor 1102 may be increased or decreased by the external controller (e.g., the control device 1116) during the calibration phase as a result of anomalous readings being incorrectly identified as true readings. This results in inaccurate measurements being taken during the measurement phase thus inhibiting operation of the device 1100. In addition, such anomalies occurring during the measurement phase may lead to the device 1100 reporting inaccurate readings from the sensor 1102.

To address some, if not all, of these issues, the external controller, such as the control device 1116, employs the method 300 of FIG. 3 to identify and replace outlier portions (anomalies) during both the calibration phase and the measurement. By efficiently and accurately replacing anomalous readings, the external controller can improve calibration of the device 1100 and help obtain readings from the sensor 1102 which more accurately reflect the true measurements being taken. The method 300 of FIG. 3 may thus be used to improve the operation of devices such as the device 1100 of FIGS. 11A-11B.

For example, the time-series signal comprises electronic measurements collected by a sensor over time. In this example, the time-series signal comprises electronic potential at a plurality of time points; the training window is longer than 5 minutes; and the first window and/or second window is longer than 2 minutes. As such, the training window is longer than the first window and/or the second window. The sensor 1102 is a polymer-based ion selective electrode and, optionally, the time-series signal is associated with spot monitoring based on converting activity of an ion dissolved in a solution to electrical potential.

Figure 12:
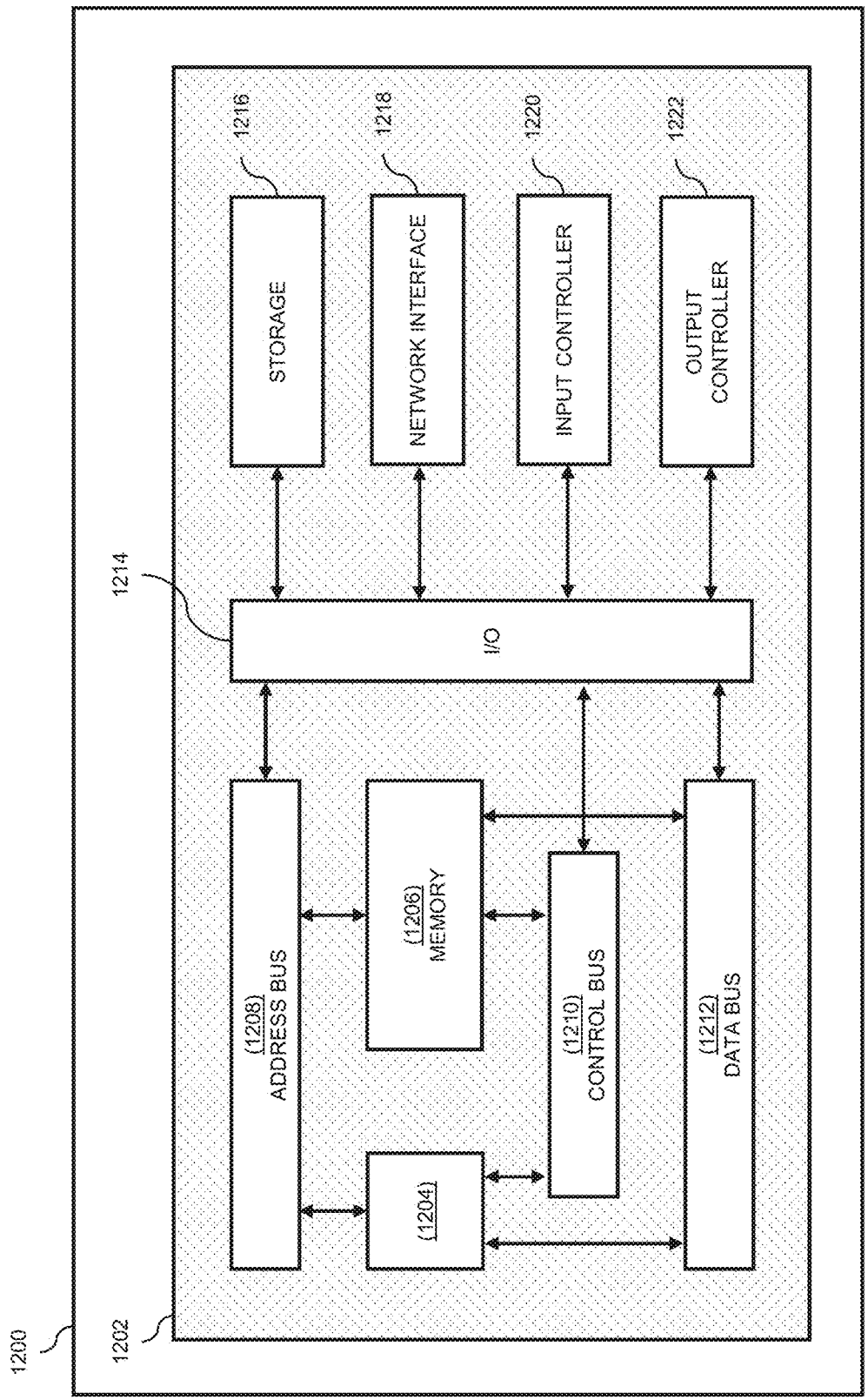
FIG. 12 shows an example computing system for time-series based anomaly detection according to an aspect of the present disclosure.

FIG. 12 shows an example computing system for time-series based anomaly detection. Specifically, FIG. 12 shows a block diagram of an embodiment of a computing system according to example aspects and embodiments of the present disclosure.

Computing system 1200 can be configured to perform any of the operations disclosed herein such as, for example, any of the operations discussed with reference to the method described in relation to FIGS. 2, 3, 6 and 8. Computing system includes one or more computing device(s) 1202. One or more computing device(s) 1202 of computing system 1200 comprise one or more processors 1204 and memory 1206. One or more processors 1204 can be any general-purpose processor(s) configured to execute a set of instructions. For example, one or more processors 1204 can be one or more general-purpose processors, one or more field programmable gate array (FPGA), and/or one or more application specific integrated circuits (ASIC). In one embodiment, one or more processors 1204 include one processor. Alternatively, one or more processors 1204 include a plurality of processors that are operatively connected. One or more processors 1204 are communicatively coupled to memory 1206 via address bus 1208, control bus 1210, and data bus 1212. Memory 1206 can be a random-access memory (RAM), a read-only memory (ROM), a persistent storage device such as a hard drive, an erasable programmable read-only memory (EPROM), and/or the like. The one or more computing device(s) 1202 further comprise I/O interface 1214 communicatively coupled to address bus 1208, control bus 1210, and data bus 1212.

Memory 1206 can store information that can be accessed by one or more processors 1204. For instance, memory 1206 (e.g. one or more non-transitory computer-readable storage mediums, memory devices) can include computer-readable instructions (not shown) that can be executed by one or more processors 1204. The computer-readable instructions can be software written in any suitable programming language or can be implemented in hardware. Additionally, or alternatively, the computer-readable instructions can be executed in logically and/or virtually separate threads on one or more processors 1204. For example, memory 1206 can store instructions (not shown) that when executed by one or more processors 1204 cause one or more processors 1204 to perform operations such as any of the operations and functions for which computing system 1200 is configured, as described herein. In addition, or alternatively, memory 1206 can store data (not shown) that can be obtained, received, accessed, written, manipulated, created, and/or stored. In some implementations, the one or more computing device(s) 1202 can obtain from and/or store data in one or more memory device(s) that are remote from the computing system 1200.

Computing system 1200 further comprises storage unit 1216, network interface 1218, input controller 1220, and output controller 1222. Storage unit 1216, network interface 1218, input controller 1220, and output controller 1222 are communicatively coupled via I/O interface 1214.

Storage unit 1216 is a computer readable medium, preferably a non-transitory computer readable medium, comprising one or more programs, the one or more programs comprising instructions which when executed by one or more processors 1204 cause computing system 1200 to perform the method steps of the present disclosure. Alternatively, storage unit 1216 is a transitory computer readable medium. Storage unit 1216 can be a persistent storage device such as a hard drive, a cloud storage device, or any other appropriate storage device.

Network interface 1218 can be a Wi-Fi module, a network interface card, a Bluetooth module, and/or any other suitable wired or wireless communication device. In an embodiment, network interface 1218 is configured to connect to a network such as a local area network (LAN), or a wide area network (WAN), the Internet, or an intranet.

FIG. 12 illustrates one example computing system 1200 that can be used to implement the present disclosure. Other computing systems can be used as well. Computing tasks discussed herein as being performed at and/or by one or more functional unit(s) can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

What is claimed is:

1. A computer-implemented method for time-series based anomaly detection, the method comprising:
    obtaining a first predictor trained on a set of training observations within a training window of a time-series signal, wherein the first predictor forecasts a predicted observation for a given time point;
    obtaining a first set of observations of the time-series signal within a first window, the first window being subsequent to the training window;
    forecasting, using the first predictor, a first set of predicted observations within the first window such that each time point within the first window is associated with an observation within the first set of observations and a predicted observation within the first set of predicted observations;
    calculating a residual signal based on a difference between one or more observations of the first set of observations and one or more predicted observations of the first set of predicted observations;
    determining a gradient of the residual signal, wherein the gradient is indicative of a degree of divergence between the first set of observations and the first set of predicted observations over the first window; and
    when the gradient is outside a predetermined range:
    retraining the first predictor on the first set of observations thereby generating a retrained predictor;
    obtaining a second set of observations of the time-series signal within a second window, the second window being subsequent to the first window;
    forecasting, using the retrained predictor, a second set of predicted observations within the second window;
    generating a confidence envelope for the second window based on the second set of predicted observations;
    using the confidence envelope to determine if an outlier portion exists within the second window, wherein the outlier portion comprises one or more observations of the second set of observations that are outside the confidence envelope; and
    increasing the first window until the gradient is outside a predetermined range.

2. The computer-implemented method of claim 1, wherein calculating a residual signal further comprises:
    smoothing the first set of observations and the first set of predicted observations thereby generating a smoothed set of observations and a smoothed set of predicted observations, wherein the residual signal is calculated from the smoothed set of observations and the smoothed set of predicted observations.

3. The computer-implemented method of claim 2, further comprising:
    applying exponential smoothing independently to the first set of observations and to the first set of predicted observations.

4. The computer-implemented method of claim 1, wherein the first predictor comprises a deep learning model.

5. The computer-implemented method of claim 4, wherein the deep learning model is an adapted generative adversarial network (GAN), further comprising:
    applying Wasserstein loss during training of the adapted GAN, wherein Wasserstein loss is based on evaluating an effort required to make the first set of predicted observations equal to the first set of observations; and
    applying a Lipschitz constraint to a discriminator of the GAN, preventing a gradient value above the Lipschitz constraint from being used during training.

6. The computer-implemented method of claim 1, further comprising:
    applying a Lipschitz constraint to the determined gradient such that the predetermined range is between −1 and +1.

7. The computer-implemented method of claim 1, wherein the first predictor is configured to generate multidimensional outputs in response to receiving multidimensional inputs, such that:
    the first predictor is trained on a plurality of training sets, each training set comprising one or more training observations within a training window of a time-series signal, wherein the first predictor forecasts, for each time-series signal, at least one predicted observation for a given time point;

a residual signal is calculated for each time-series signal, wherein a gradient for each residual signal is determined; and if one or more gradients are outside the predetermined range, the first predictor is retrained on a plurality of first sets of observations, thereby generating a retrained predictor.

8. The computer-implemented method of claim 1, wherein the confidence envelope is estimated from one or more of:
an error rate of the first predictor;
a probabilistic deviation of the second set of predicted observations; or
a predetermined confidence value applied to the second set of predicted observations.

9. The computer-implemented method of claim 1, further comprising:
determining a deviation point for the outlier portion, the deviation point being associated with a point in time at which the outlier portion begins, wherein determining a deviation point comprises:
determining a transformed signal based on observations within the second window, wherein the transformed signal is indicative of a rate of change of the time-series signal within the second window;
calculating a threshold based on a stationary portion of the transformed signal; and
identifying the deviation point within the time-series signal based on a point in time where the transformed signal crosses the threshold.

10. The computer-implemented method of claim 1, further comprising:
when the gradient is not outside a predetermined range:
obtaining a second set of observations of the time-series signal within a second window, the second window subsequent to the first window;
forecasting, using the first predictor, a second set of predicted observations within the second window;
generating a confidence envelope for the second window based on the second set of predicted observations; and
using the confidence envelope to determine if an outlier portion exists within the second window, wherein the outlier portion comprises one or more observations of the time-series signal that are outside the confidence envelope.

11. The computer-implemented method of claim 1, wherein one or more observation and/or predicted observation is a series of observations.

12. The computer-implemented method of claim 1, wherein the first predictor is any of a recurrent neural network, a convolutional neural network, a long short-term memory model, an autoencoder, or a Boltzmann machine.

13. The computer-implemented method of claim 1, wherein the time-series signal comprises electronic measurements collected by a sensor over time.

14. The computer-implemented method of claim 13, wherein:
the time-series signal comprises electronic potential at a plurality of time points; and
the training window is longer than the first window and/or second window.

15. The computer-implemented method of claim 13, wherein the sensor is a polymer-based ion selective electrode.

16. The computer-implemented method of claim 15, wherein the time-series signal is associated with spot monitoring based on converting activity of an ion dissolved in a solution to electrical potential.

17. The computer-implemented method of claim 1, further comprising:
replacing the outlier portion of the time-series signal with a predicted portion, the predicted portion determined by the retrained predictor and based on observations within the second window that are not within the outlier portion.

18. A non-transitory computer-readable medium storing instructions which, when executed by one or more processors, cause the one or more processors to perform:
obtaining a first predictor trained on a set of training observations within a training window of a time-series signal, wherein the first predictor forecasts a predicted observation for a given time point;
obtaining a first set of observations of the time-series signal within a first window, the first window being subsequent to the training window;
forecasting, using the first predictor, a first set of predicted observations within the first window such that each time point within the first window is associated with an observation within the first set of observations and a predicted observation within the first set of predicted observations;
calculating a residual signal based on a difference between one or more observations of the first set of observations and one or more predicted observations of the first set of predicted observations;
determining a gradient of the residual signal, wherein the gradient is indicative of a degree of divergence between the first set of observations and the first set of predicted observations over the first window; and
when the gradient is outside a predetermined range:
retraining the first predictor on the first set of observations thereby generating a retrained predictor;
obtaining a second set of observations of the time-series signal within a second window, the second window being subsequent to the first window;
forecasting, using the retrained predictor, a second set of predicted observations within the second window;
generating a confidence envelope for the second window based on the second set of predicted observations;
using the confidence envelope to determine if an outlier portion exists within the second window, wherein the outlier portion comprises one or more observations of the second set of observations that are outside the confidence envelope; and
increasing the first window until the gradient is outside a predetermined range.

19. A device comprising:
one or more processors; and
a memory storing instructions which, when executed by the one or more processors, cause the one or more processors to perform:
obtaining a first predictor trained on a set of training observations within a training window of a time-series signal, wherein the first predictor forecasts a predicted observation for a given time point;
obtaining a first set of observations of the time-series signal within a first window, the first window being subsequent to the training window;
forecasting, using the first predictor, a first set of predicted observations within the first window such that each time point within the first window is associated with an observation within the first set of observations and a predicted observation within the first set of predicted observations;

calculating a residual signal based on a difference between one or more observations of the first set of observations and one or more predicted observations of the first set of predicted observations;

determining a gradient of the residual signal, wherein the gradient is indicative of a degree of divergence between the first set of observations and the first set of predicted observations over the first window; and when the gradient is outside a predetermined range:

retraining the first predictor on the first set of observations thereby generating a retrained predictor;

obtaining a second set of observations of the time-series signal within a second window, the second window being subsequent to the first window;

forecasting, using the retrained predictor, a second set of predicted observations within the second window;

generating a confidence envelope for the second window based on the second set of predicted observations;

using the confidence envelope to determine if an outlier portion exists within the second window, wherein the outlier portion comprises one or more observations of the second set of observations that are outside the confidence envelope; and increasing the first window until the gradient is outside a predetermined range.

\* \* \* \* \*